US012585417B2

(12) United States Patent　　　(10) Patent No.:　US 12,585,417 B2
Lee et al.　　　　　　　　　　　　(45) Date of Patent:　　Mar. 24, 2026

(54) ELECTRONIC DEVICE AND METHOD FOR SHARING SCREENS AND AUDIO SIGNALS CORRESPONDING TO SCREENS

(71) Applicant: Samsung Electronics Co., Ltd., Suwon-si (KR)

(72) Inventors: Kyungryol Lee, Suwon-si (KR); Jiyong Yang, Suwon-si (KR); Soeun Kwon, Suwon-si (KR); Younghyun Kim, Suwon-si (KR); Hakjoo Kim, Suwon-si (KR); Sangho Park, Suwon-si (KR); Woonyong Seo, Suwon-si (KR); Areum Choi, Suwon-si (KR); Sungjun Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/428,943

(22) Filed: Jan. 31, 2024

(65) Prior Publication Data

US 2024/0168698 A1　　May 23, 2024

Related U.S. Application Data

(63) Continuation of application No. PCT/KR2022/011531, filed on Aug. 4, 2022.

(30) Foreign Application Priority Data

Sep. 16, 2021　(KR) ........................ 10-2021-0124392
Oct. 5, 2021　(KR) ........................ 10-2021-0131963

(51) Int. Cl.
　　*G06F 3/14*　　　　(2006.01)
　　*G06F 3/16*　　　　(2006.01)

(52) U.S. Cl.
　　CPC ............ *G06F 3/1454* (2013.01); *G06F 3/165* (2013.01)

(58) Field of Classification Search
　　CPC .......... G06F 3/14; G06F 3/1454; G06F 3/165; H04N 21/439; H04N 21/816
　　See application file for complete search history.

(56) References Cited

U.S. PATENT DOCUMENTS 8,683,496 B2　　3/2014　Reeves
9,008,177 B2　　4/2015　Rabii
　　　　　　(Continued)

FOREIGN PATENT DOCUMENTS

JP　　　　5989797 B2　　8/2016
KR　　20140137834 A　　12/2014
　　　　　　(Continued)

OTHER PUBLICATIONS

Extended Search Report dated Nov. 15, 2024 in European Patent Application No. 22870144.7.
　　　　　　(Continued)

*Primary Examiner* — Kenneth Bukowski
(74) *Attorney, Agent, or Firm* — Nixon & Vanderhye, P.C.

(57) ABSTRACT

According to an embodiment, in response to receiving a first designated request from another electronic device while outputting a first screen and first audio, at least one processor of an electronic device, individually and/or collectively, may be configured to control the electronic device to transmit a first signal and a second signal for outputting the first screen and the first audio by the other electronic device, respectively. While transmitting the first signal and the second signal, at least one processor may individually and/or collectively be configured to control the electronic device to receive, from the other electronic device, a second desig-
　　　　　　(Continued)

nated request for executing a second application distinct from the first application related to the first audio. In response to the second designated request, at least processor, individually and/or collectively may be configured to control the electronic device to transmit a third signal and a fourth signal, which are related to a second screen of the second application and second audio, respectively, to the other electronic device together with the first signal and the second signal.

20 Claims, 16 Drawing Sheets

(56)                References Cited

U.S. PATENT DOCUMENTS

|  |  |  |  |  |
|---|---|---|---|---|
| 9,419,923 | B2 | 8/2016 | Seo et al. | |
| 10,776,068 | B2 * | 9/2020 | Hong | H04W 12/50 |
| 10,838,488 | B2 * | 11/2020 | Gibson | G06F 3/011 |
| 10,866,706 | B2 | 12/2020 | Keam et al. | |
| 10,983,749 | B2 | 4/2021 | Kim et al. | |
| 11,416,204 | B2 | 8/2022 | Park | |
| 11,435,974 | B2 * | 9/2022 | Lee | G06F 3/1454 |
| 11,487,558 | B2 | 11/2022 | Park et al. | |
| 11,490,184 | B2 | 11/2022 | Kim et al. | |
| 11,570,514 | B2 * | 1/2023 | Lee | H04N 21/4858 |
| 2013/0123019 | A1 | 5/2013 | Sullivan et al. | |
| 2014/0025847 | A1 * | 1/2014 | Choi | G06F 13/102 |
| | | | | 710/33 |
| 2014/0026068 | A1 * | 1/2014 | Park | H04N 21/41265 |
| | | | | 715/748 |
| 2016/0094603 | A1 * | 3/2016 | Liao | H04L 67/565 |
| | | | | 709/204 |
| 2016/0162130 | A1 * | 6/2016 | Yoon | G06F 3/04883 |
| | | | | 715/783 |
| 2016/0174277 | A1 * | 6/2016 | Yoon | H04W 76/14 |
| | | | | 370/338 |
| 2016/0253142 | A1 * | 9/2016 | Choi | G06F 3/1423 |
| | | | | 345/1.3 |
| 2018/0267773 | A1 * | 9/2018 | Kim | G06F 3/165 |
| 2018/0314486 | A1 * | 11/2018 | Edry | G09G 5/006 |
| 2019/0065018 | A1 * | 2/2019 | Keam | G06F 3/041 |
| 2019/0065034 | A1 * | 2/2019 | Choi | G06F 3/04886 |
| 2021/0014591 | A1 * | 1/2021 | Kim | H04R 1/028 |
| 2021/0042132 | A1 * | 2/2021 | Park | H04L 67/10 |
| 2021/0097208 | A1 * | 4/2021 | Donahue | G06F 21/84 |
| 2021/0149618 | A1 * | 5/2021 | Lee | G06F 3/16 |

FOREIGN PATENT DOCUMENTS

| | | | |
|---|---|---|---|
| KR | 101579025 | B1 | 12/2015 |
| KR | 20160092363 | A | 8/2016 |
| KR | 20190021562 | A | 3/2019 |
| KR | 20190051198 | A | 5/2019 |
| KR | 102090745 | B1 | 4/2020 |
| KR | 20210007289 | A | 1/2021 |
| KR | 20210061199 | A | 5/2021 |
| KR | 102345610 | B1 | 12/2021 |
| WO | 2018/169365 | | 9/2018 |

OTHER PUBLICATIONS

Office Action dated Oct. 20, 2025 in Korean Patent Application No. 10-2021-0131963 and English-language translation.
International Search Report for PCT/KR2022/011531 mailed Nov. 10, 2022, 5 pages.
Written Opinion of the ISA for PCT/KR2022/011531 mailed Nov. 10, 2022, 5 pages.

* cited by examiner

374

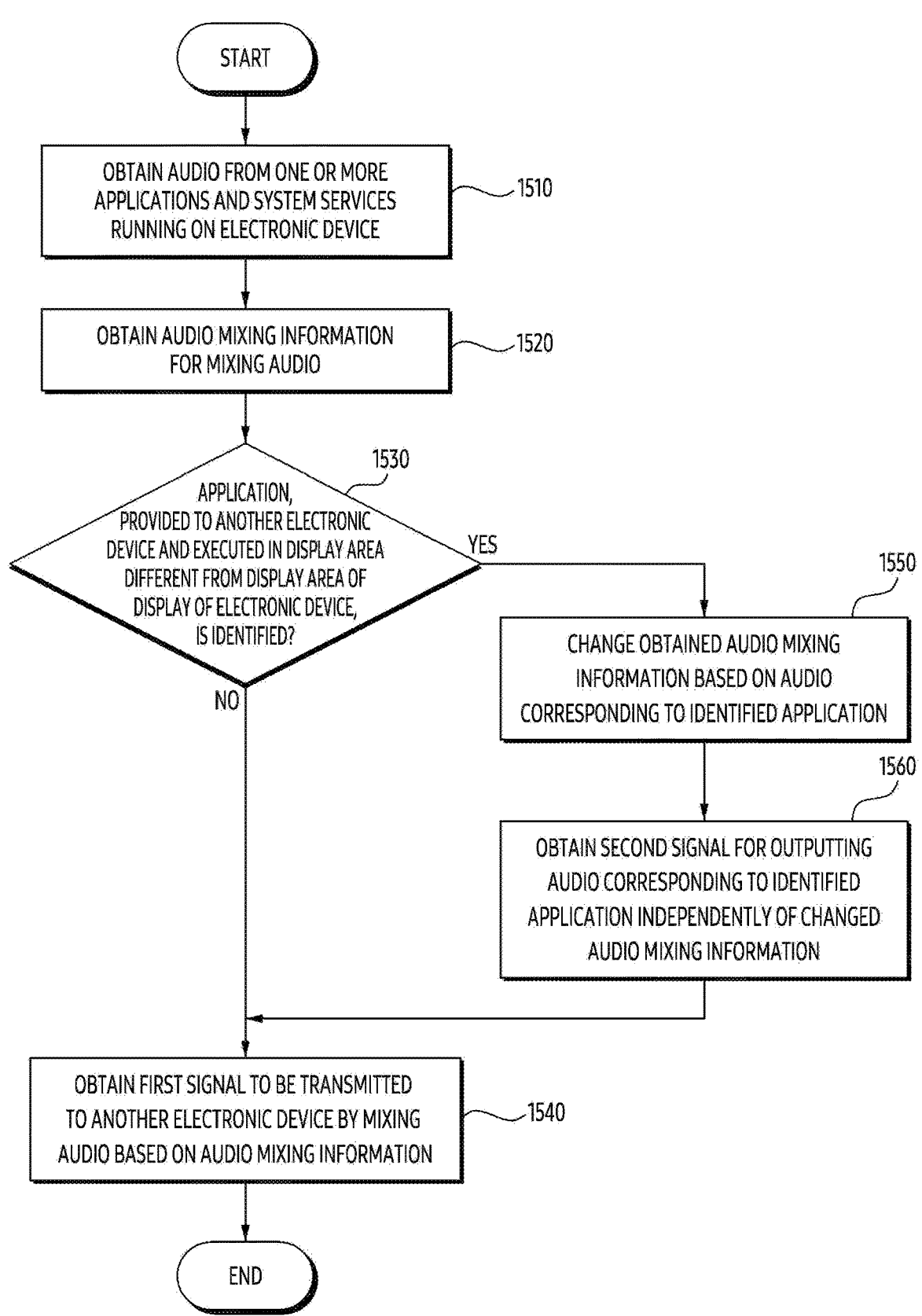

START

OBTAIN AUDIO FROM ONE OR MORE
APPLICATIONS AND SYSTEM SERVICES
RUNNING ON ELECTRONIC DEVICE ⟶ 1510

OBTAIN AUDIO MIXING INFORMATION
FOR MIXING AUDIO ⟶ 1520

1530

APPLICATION,
PROVIDED TO ANOTHER ELECTRONIC
DEVICE AND EXECUTED IN DISPLAY AREA
DIFFERENT FROM DISPLAY AREA OF
DISPLAY OF ELECTRONIC DEVICE,
IS IDENTIFIED?

YES

1550

CHANGE OBTAINED AUDIO MIXING
INFORMATION BASED ON AUDIO
CORRESPONDING TO IDENTIFIED APPLICATION

1560

OBTAIN SECOND SIGNAL FOR OUTPUTTING
AUDIO CORRESPONDING TO IDENTIFIED
APPLICATION INDEPENDENTLY OF CHANGED
AUDIO MIXING INFORMATION

NO

OBTAIN FIRST SIGNAL TO BE TRANSMITTED
TO ANOTHER ELECTRONIC DEVICE BY MIXING
AUDIO BASED ON AUDIO MIXING INFORMATION ⟶ 1540

END

FIG. 15

ELECTRONIC DEVICE AND METHOD FOR SHARING SCREENS AND AUDIO SIGNALS CORRESPONDING TO SCREENS

CROSS-REFERENCE TO RELATED APPLICATIONS

This application is a continuation of International Application No. PCT/KR2022/011531 designating the United States, filed on Aug. 4, 2022, in the Korean Intellectual Property Receiving Office and claiming priority to Korean Patent Application Nos. 10-2021-0124392, filed on Sep. 16, 2021, and 10-2021-0131963, filed on Oct. 5, 2021, in the Korean Intellectual Property Office, the disclosures of each of which are incorporated by reference herein in their entireties.

BACKGROUND

Field

The disclosure relates to an electronic device and a method for sharing screens and audio signals corresponding to the screens.

Description of Related Art

With the development of digital technology, electronic devices capable of performing communication and/or information processing while having mobility such as mobile communication terminal, PDA (personal digital assistant), electronic notebook, smart phone, tablet PC (personal computer), or wearable device (wearable device) are spreading. Such electronic devices provide services such as voice calls and text message transmission, as well as various services such as taking pictures, finding directions, or providing web interfaces.

Meanwhile, as access to content such as photos and videos increases due to the development of communication technology, various technologies for sharing such content are being developed.

In a state in which a user receives a screen of another electronic device using an electronic device, a method for outputting audio generated from another electronic device through the electronic device may be required.

In a state in which a user simultaneously executes a plurality of applications stored in another electronic device using an electronic device, a method for reproducing a plurality of audio caused by each of the plurality of applications using the electronic device may be required.

The technical problems to be addressed in this disclosure are not limited to those described above, and other technical problems not mentioned herein will be clearly understood by those having ordinary knowledge in the art to which the present disclosure belongs, from the following description.

SUMMARY

The electronic device according to an example embodiment may comprise: communication circuitry, a display, a speaker; one or more processors; and memory storing instructions that, when executed by the one or more processors individually or collectively, cause the electronic device to: receive, while providing a first audio to the speaker based on at least one first application and displaying a first screen in a displaying area of the display, a first specified request from another electronic device via the communication circuitry; control the electronic device to transmit, in response to receiving the first specified request, a first signal for outputting the first screen displayed in the displaying area to the another electronic device, and a second signal for outputting the first audio output from the speaker to the another electronic device; while transmitting the first signal and the second signal, control the electronic device to receive, from the another electronic device, a second specified request for executing a second application different from the first application; in response to receiving the second preset request, control the display to display, in the displaying area, the first screen among the first screen and a second screen obtained by execution of the second application, and control the electronic device to transmit, to the another electronic device, a third signal for displaying the second screen in the another electronic device, and a fourth signal for outputting a second audio obtained from the second application to the another electronic device.

A method of operating an electronic device according to an example embodiment may comprise receiving, while providing a first audio to a speaker of the electronic device based on at least one first application and displaying a first screen in a displaying area of a display of the electronic device, a first specified request from another electronic device; transmitting, in response to receiving the first specified request, a first signal for outputting the first screen displayed in the displaying area to the another electronic device, and a second signal for outputting the first audio output from the speaker to the another electronic device; while transmitting the first signal and the second signal, receiving, from the another electronic device, a second specified request for executing a second application different from the first application by the electronic device; in response to receiving the second specified request, displaying, in the displaying area, the first screen among the first screen and a second screen obtained by execution of the second application, and further transmitting, to the another electronic device, a third signal for displaying the second screen in the another electronic device, and a fourth signal for outputting a second audio obtained from the second application to the another electronic device.

An electronic device according to an example embodiment may comprise: communication circuitry, a display, a speaker, one or more processors; and memory storing instructions that, when executed by the one or more processors individually or collectively, cause the electronic device to: output, in a first portion of the display, a first screen provided from another electronic device different from the electronic device via the communication circuitry, and output, via the speaker, a first audio corresponding to the first screen provided from the another electronic device; in a state of outputting the first screen and the first audio, output, in a second portion different from the first portion, a second screen provided from the another electronic device, and output, via the speaker, a second audio corresponding to the second screen provided from the another electronic device; and in a state of outputting the first screen, the second screen, the first audio and the second audio, adjust, in response to receiving an input for adjusting a volume of the first audio, the volume of the first audio independent from second audio output from the speaker.

A method of operating an electronic device according to an example embodiment may comprise: outputting, in a first portion of the display, a first screen provided from another electronic device different from the electronic device via the communication circuitry, and outputting, via the speaker, a first audio corresponding to the first screen provided from the another electronic device; in a state of outputting the first screen and the first audio, outputting, in a second portion different from the first portion, a second screen provided from the another electronic device, and outputting, via the speaker, a second audio corresponding to the second screen provided from the another electronic device; and in a state of outputting the first screen, the second screen, the first audio and the second audio, adjusting, in response to receiving an input for adjusting a volume of the first audio, the volume of the first audio independent from second audio output from the speaker.

The electronic device according to an example embodiment can play a plurality of audio caused by each of the plurality of applications, together with screens corresponding to each of the plurality of applications executed in another electronic device.

In the state of reproducing the plurality of audio, the electronic device according to an example embodiment can reproduce each of the plurality of audio based on a plurality of independently controllable volumes.

The effects that can be obtained from the present disclosure are not limited to those described above, and any other effects not mentioned herein will be clearly understood by those having ordinary knowledge in the art to which the present disclosure belongs, from the following disclosure.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 15 is a flowchart illustrating an example operation in which an electronic device mixes audio provided from a plurality of applications being executed in the electronic device, according to various embodiments.

DETAILED DESCRIPTION

Figure 1:
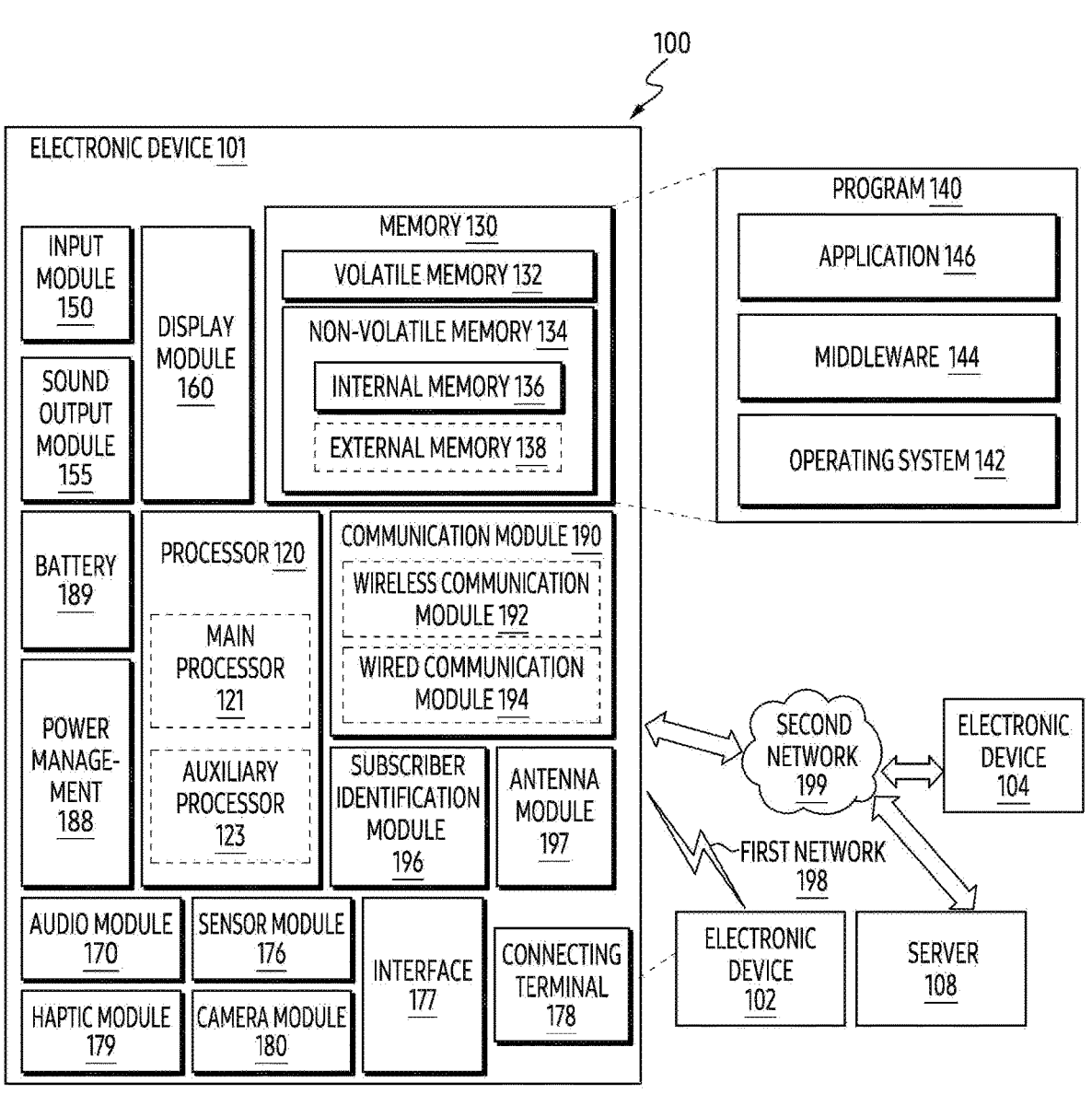
FIG. 1 is a block diagram illustrating an example electronic device in a network environment according to various embodiments.

Hereinafter, various example embodiments of the disclosure will be described in greater detail with reference to the accompanying drawings.

Various example embodiments of the disclosure and the terms used therein are not intended to limit the technology described in this disclosure to a specific embodiment, and should be understood to include various modifications, equivalents, and/or substitutions of those embodiments. In connection with the description of the drawings, like reference numerals may be used for like components. The singular expression may include the plural expression, unless the context clearly dictates otherwise. Throughout this disclosure, expressions such as "A or B", "at least one of A and/or B", "A, B or C" or "at least one of A, B and/or C" may include all the possible combinations of the items listed together. Expressions such as "first", "second" or the like may modify the corresponding elements regardless of their order or importance, and are used only to distinguish one element from another element and not intended to limit the corresponding elements thereto. When a certain (e.g., a first) element is referred to as being "(functionally or communicatively) connected" or "coupled" to another (e.g., a second) element, the element (e.g., the first) may be either directly connected to the other element (e.g., the second) or may be connected through another element (e.g., a third component).

As used herein, the term "module" may include a unit comprising hardware, software, or firmware, or any combination thereof, and may be used interchangeably with terms such as, for example, logic, logic block, component, or circuit. A module may be of an integrally formed component or a minimum unit or a part thereof performing one or more functions. For example, the module may be configured as an application-specific integrated circuit (ASIC).

FIG. 1 is a block diagram illustrating an example electronic device 101 in a network environment 100 according to various embodiments. Referring to FIG. 1, the electronic device 101 in the network environment 100 may communicate with an electronic device 102 via a first network 198

(e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
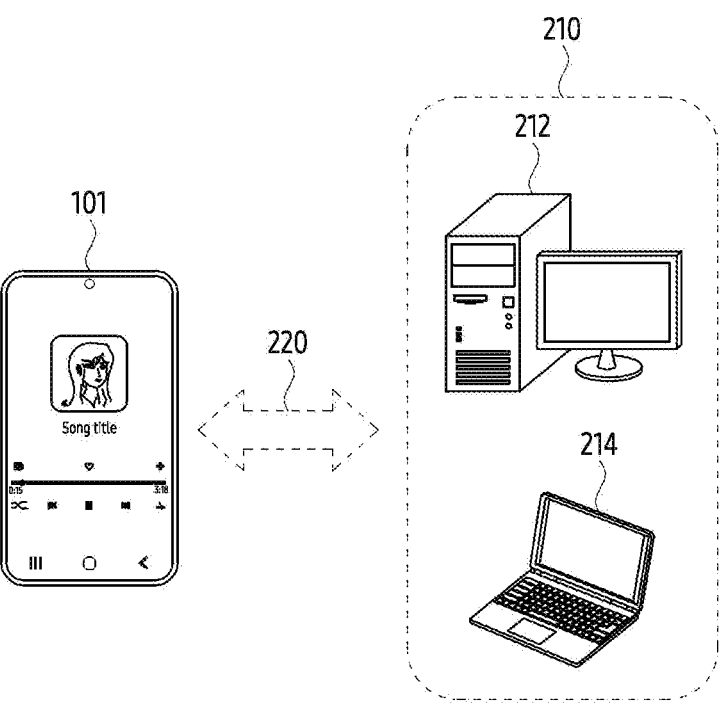
FIG. 2 is a diagram illustrating an example operation of sharing a screen by electronic devices according to various embodiments.

FIG. 2 is a diagram illustrating an example operation of sharing a screen by electronic devices according to various embodiments. Referring to FIG. 2, an example situation in which at least one of the electronic device 101 and the electronic devices 210 is connected to each other based on a wired network and/or a wireless network is illustrated. A hardware component included in at least one of the electronic device 101 and the electronic devices 210 will be described in greater detail below with reference to FIG. 3.

The wired network may include a network such as the Internet, a local area network (LAN), a wide area network (WAN), Ethernet, or a combination thereof. The wireless network may include a network such as Long Term Evolution (LTE), 5g New Radio (NR), Wireless Fidelity (WiFi), Zigbee, Near Field Communication (NFC), Bluetooth, Bluetooth Low-Energy (BLE), or a combination thereof. Although at least one of the electronic device 101 and the electronic devices 210 is illustrated as being directly connected, At least one of the electronic device 101 and the electronic devices 210 may be indirectly connected through one or more routers and/or access points (APs).

Referring to FIG. 2, the electronic device 101 and the electronic devices 210 may be terminals that may, for example, be owned by a user. The terminal may include, for example, a personal computer (PC) such as a laptop and a desktop, a smartphone, a smart pad, a tablet PC, smart accessories such as smartwatches (smartwatches), and head-mounted devices (HMDs). Referring to FIG. 2, An example in which the electronic device 101 may correspond, for example, and without limitation, to a smartphone, a smart pad, and a tablet PC, and the electronic devices 210 correspond to a personal computer such as an electronic device 212 corresponding to a desktop and an electronic device 214 corresponding to a laptop is illustrated. The embodiment is not limited to an example of FIG. 2.

The electronic device 101 according to an embodiment may transmit video (e.g., a screen obtained from an application) and/or audio (e.g., audio provided from an application) obtained from one or more applications running in the electronic device 101 as at least one of the electronic devices 210. Hereinafter, the mirroring function is a function of the electronic device 101, and may refer, for example, to a function of transmitting the video and/or the audio as at least one of the electronic devices 210. The mirroring function may be referred to as a cast function and/or a mirror link function. The electronic devices 210 receiving the video and/or the audio may output the video and/or the audio using a display and/or a speaker. In a state of performing the mirroring function, based on streaming, the electronic devices 210 may substantially simultaneously transmit and output the video and/or the audio.

In a state of receiving video and/or audio from the electronic device 101 according to an embodiment, the electronic devices 210 may transmit a user input through an input means (e.g., a keyboard and/or a mouse) of the electronic devices 210 to the electronic device 101. The user input may be related to the video and/or the audio output from at least one of the electronic devices 210 and provided from the electronic device 101. In response to the user input detected by the electronic devices 210, the electronic device 101 may change the video and/or the audio transmitted to the electronic devices 210. Referring to FIG. 2, based on the connection 220 established between the electronic device 101 and at least one of the electronic devices 210, the video, the audio, and/or the signal representing the user input may be transmitted. Hereinafter, the connection 220 may refer, for example, to an end-to-end connection established in a network and/or a peer-to-peer connection such as a session.

The electronic device 101 according to an embodiment may simultaneously output distinct screens to at least one of the electronic devices 210. Each of the distinct screens may include, for example, a screen obtained from one or more applications executed in the electronic device 101 by a user input detected by at least one of a screen and/or electronic devices 210 displayed on the display of electronic device 101. In a state in which a plurality of screens is output to at least one of the electronic devices 210, volumes of each of a plurality of audio signals corresponding to each of the plurality of screens may be independently controlled. In order to independently control the volumes, the electronic device 101 may obtain a plurality of audio signals to be transmitted to the electronic devices 210 using distinct signal paths corresponding to each of a plurality of applications corresponding to each of the plurality of audio signals. The signal paths may be classified based on an identifier assigned to each of the plurality of applications, the plurality of screens, or the plurality of screens.

In an embodiment, in response to receiving a plurality of distinguishable audio signals within the connection 220, the electronic devices 210 may independently change volumes of each of the plurality of audio signals. The volumes may be adjusted, for example, by a user interface (UI) displayed on each of some distinct parts on the display of electronic devices 210. For example, the electronic devices 210 may display a UI for adjusting the volume of the corresponding audio signal on each of a plurality of screens paired with each of the plurality of audio signals.

As described above, as at least one of the electronic devices 210 according to an embodiment, the electronic device 101 may establish a connection 220 for transmitting a plurality of screens based on a mirroring function and a plurality of audio signals corresponding to each of the plurality of screens. Within the connection 220, the plurality of audio signals may be transmitted independently. As one or more audio signals are independently transmitted, at least one of the electronic devices 210 executing a mirroring function related to the electronic device 101 may adjust volumes corresponding to each of the one or more audio signals. One or more programs executed by the electronic device 101 according to an embodiment to support a mirroring function will be described in greater detail below with reference to FIGS. 4 to 6. One or more programs executed by at least one of the electronic devices 210 according to an embodiment to support a mirroring function will be described in greater detail below with reference to FIGS. 4 and/or 7. An example of a UI displayed by at least one of the electronic devices 210 according to an embodiment will be described in greater detail below with reference to FIGS. 8 and/or 10. A connection 220 established between at least one of the electronic device 101 and the electronic devices 210 according to an embodiment will be described in greater detail below with reference to FIG. 9.

Hereinafter, one or more hardware components included in each of the electronic device 101 and the electronic devices 210 according to an embodiment and related to a mirroring function will be described in greater detail below with reference to FIG. 3.

Figure 3:
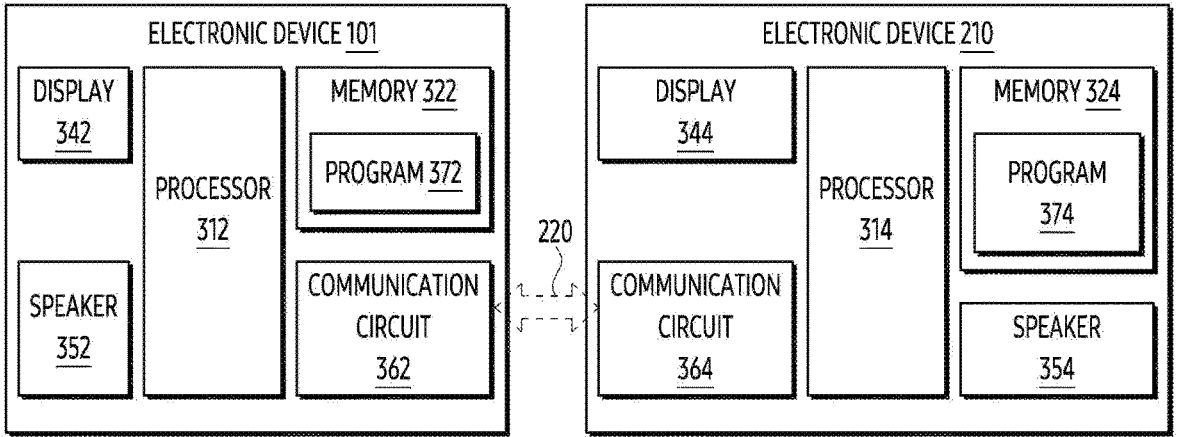
FIG. 3 is a block diagram illustrating example configurations of electronic devices according to various embodiments.

FIG. 3 is a block diagram illustrating an example configuration of electronic devices 101 and 210 according to various embodiments. The electronic device 101 of FIG. 3 may correspond to an example of the electronic device 101 of FIGS. 1 to 2. The electronic device 210 of FIG. 3 may correspond to an example of the electronic devices 210 of FIG. 2.

Referring to FIG. 3, each of the electronic device 101 and the electronic device 210 according to an embodiment may include at least one of processors (e.g., including processing circuitry) 312 and 314, memories 322 and 324, displays 342 and 344, speakers 352 and 354, and/or communication circuits 362 and 364. Hardware components included in each of the electronic device 101 and the electronic device 210 may be electrically and/or operably coupled with each other by an electronic component such as a communication bus. The type and/or number of hardware components included in each of the electronic device 101 and the electronic device 210 are not limited to those illustrated in FIG. 3. The processors 312 and 314, the memories 322 and 324, the displays 342 and 344, the speakers 352 and 354, and the communication circuits 362 and 364 may correspond to each of the processors 120, the memory 130, the display module 160, and the audio module 170 of FIG. 1. Each of the communication circuits 362 and 364 may correspond to the communication module 190, the antenna module 197, the subscriber identification module 196, or a combination thereof of FIG. 1.

Referring to FIG. 3, programs 372 and 374 stored in each of the memories 322 and 324 may correspond to a set of instructions (e.g., executable program instructions) representing one or more operations to be performed respectively by each of the processors 312 and 314 for processing data. Programs 372 and 374 may be referred to as firmware, operating system (e.g., operating system 142 of FIG. 1), middleware (e.g., middleware 144 of FIG. 1), process, routine, sub-routine and/or application (e.g., application 146 of FIG. 1). Each of the electronic devices 101 and 210 according to an embodiment may execute programs 372 and 374 to perform at least one of operations to be described below, for example, operations of FIGS. 10 to 16. One or more instances and/or one or more objects included in each of the programs 372 and 374 will be described in greater detail below with reference to FIGS. 4 to 7.

For example, each of the electronic devices 101 and 210 may establish a connection 220 between the electronic devices 101 and 210 by executing the programs 372 and 374 and controlling the communication circuits 362 and 364, respectively. For example, through the connection 220 related to the mirroring function, the electronic device 101 may transmit a video indicating a screen displayed on the display 342 and/or audio output from the speaker 352 to the electronic device 210. The electronic device 210 may display the video received from the electronic device 101 on the display 344. The electronic device 210 may output the audio received from the electronic device 101 through the speaker 354. In response to detecting an event related to the mirroring function in the electronic device 210, the electronic device 210 may notify the detected event to the electronic device 101 through the connection 220. The electronic device 101 may change the video and/or the audio transmitted to the electronic device 210 in response to the event.

As described above, the electronic device 101 according to an embodiment may receive the first designated request from the electronic device 210 through the communication circuit 362 while displaying the first screen in the display area of the display 342 and providing the first audio corresponding to the first screen through the speaker 352. The first designated request may include, for example, a request for sharing the first screen and the first audio based on a mirroring function. In response to receiving the first designated request, the electronic device 101 may transmit a first signal for displaying the first screen in the electronic device 210 and a second signal for outputting the first audio through the speaker 352 to the electronic device 210. The first signal and the second signal may be transmitted from the electronic device 101 to the electronic device 210 through the connection 220. While transmitting the first signal and the second signal, the electronic device 101 may receive a second designated request from the electronic device 210 to execute a second application (e.g., an application before being executed by the electronic device 101) distinguished from one or more first applications (e.g., one or more applications running by the electronic device 101) providing the first audio. In response to receiving the second designated request, the electronic device 101 may transmit a third signal for displaying in the electronic device 210 the second screen obtained by executing the second application and a fourth signal for outputting in the electronic device 210 the second audio obtained from the second application to the electronic device 210. While displaying the first screen in the display area of the display 342 and providing the first audio corresponding to the first screen through the speaker 352 is maintained, the electronic device 101 according to an embodiment obtain and transmit the third signal and the fourth signal. The third signal and the fourth signal corresponding to each of the first audio and the second audio may be individually transmitted to the electronic device 210 through a connection 220. As the third signal and the fourth signal are individually transmitted to the electronic device 210, the electronic device 210 may individually output the first audio and the second audio corresponding to each of the third signal and the fourth signal. The electronic device 210 individually outputs the first audio and the second audio, for example, may include an operation of outputting each of the first audio and the second audio based on independently controlled volumes.

Hereinafter, referring to FIG. 4, the programs (e.g., including executable program instruction) 372 and 374 executed by the electronic devices 101 and 210 to transmit and receive the first to fourth signals will be described in greater detail.

Figure 4:
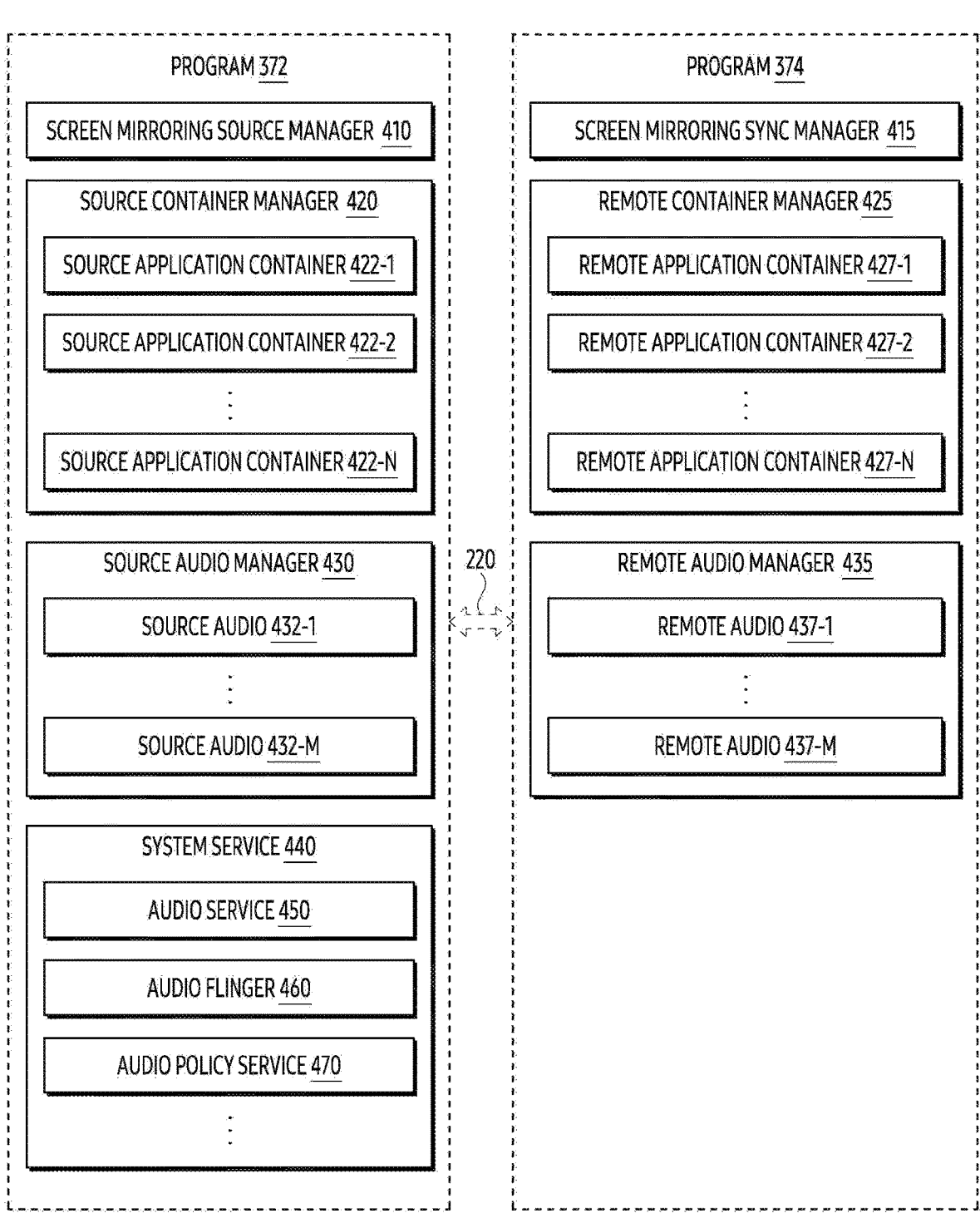
FIG. 4 is a diagram illustrating an example configuration of a program executed in each of electronic devices according to various embodiments.

FIG. 4 is a diagram illustrating example configurations of programs 372 and 374 executed in each of the electronic devices according to various embodiments. Referring to FIG. 4, one or more objects and/or one or more instances included in each of the programs 372 and 374 are illustrated. The object and/or instance may refer, for example, to a unit of one or more operations performed by the electronic device executed by programs 372 and 374.

Referring to FIG. 4, the program 372 may correspond to an example of a program (e.g., the program 372 of FIG. 3) executed by the electronic device 101 of FIGS. 1 to 3. For example, program 372 may include instructions for transmitting a screen and/or audio generated by the electronic device based on a mirroring function, the electronic device executing the program 372 to another electronic device. Program 374 may correspond to, for example, an example of a program (e.g., program 374 of FIG. 3) executed by the electronic devices 210 of FIGS. 2 to 3. For example, program 374 may include instructions for an electronic device executing program 374 to output a screen and/or audio received from another electronic device executing program 372 through the display and/or speaker of the electronic device. Hereinafter, an electronic device executing program 372 may be referred to as, for example, a source electronic device and/or a first electronic device as an electronic device serving as a source of screen and/or audio.

In an embodiment, program 372 is at least part of the operating system and/or middleware, and may be executed by the source electronic device as the source electronic device is driven based on the operating system and/or the middleware. Referring to FIG. 4, a screen mirroring source manager 410, a source container manager 420, a source audio manager 430, and a system service 440, each of which may include various executable program instructions, are illustrated as objects and/or instances activated when the source electronic device executes a program 372. In an embodiment, the source electronic device may create one or more source application containers by executing a mirroring function based on the source container manager 420. Referring to FIG. 4, N source application containers (422-1, 422-2, . . . , 422-N) generated by the source electronic device based on the source container manager 420 are illustrated. In an embodiment, the source electronic device may generate one or more source audios as the mirroring function is executed based on the source audio manager 430. Referring to FIG. 4, M source audios (432-1, . . . , and 432-M) generated by the source electronic device based on the source audio manager 430 are illustrated. For example, program 372 may include instructions corresponding to each of the screen mirroring source manager 410, the source container 420, the source application container, the source audio manager 430, and the source audio and system service 440. Hereinafter, an electronic device executing program 374 may be referred to as, for example, a remote electronic device and/or a second electronic device remotely connected to an electronic device transmitting screen and/or audio.

In an embodiment, program 374 is at least part of an application related to a mirroring function and may be executed by a remote electronic device based on a user input for executing the application. Referring to FIG. 4, a screen mirroring sink manager 415, a remote container manager 425 and a remote audio manager 435 are shown as objects and/or instances activated when the remote electronic device executes the program 374. In an embodiment, the remote electronic device may create one or more remote application containers by executing a mirroring function based on the remote container manager 425. Referring to FIG. 4, N remote application containers (427-1, 427-2, . . . , 427-N) generated by the remote electronic device based on the remote container manager 425 are illustrated. In an embodiment, the remote electronic device may generate one or more remote audio as the mirroring function is executed based on the remote audio manager 435. Referring to FIG. 4, M remote audio (437-1, . . . , and 437-M) generated by the remote electronic device based on the remote audio manager

435 are illustrated. For example, program 374 may include instructions corresponding to each of screen mirroring sink manager 415, remote container manager 425, remote application container, remote audio manager 435, and remote audio.

Instances activated by each of the programs 372 and 374 illustrated in FIG. 4 may correspond to each other according to the type of each of the instances. The source electronic device and the remote electronic device may transmit and/or receive data according to a correspondence relationship between instances within the connection 220. For example, the screen mirroring source manager 410 activated in the source electronic device may correspond to the screen mirroring sink manager 415 activated in the remote electronic device. The source container manager 420 may correspond to the remote container manager 425. N source application containers (422-1, 422-2, . . . , and 422-N) may correspond to each of the N remote application containers (427-1, 427-2, . . . , 427-N). The source audio manager 430 may correspond to the remote audio manager 435. The M source audio (432-1, . . . , and 432-M) may correspond to each of the M remote audio (437-1, . . . , and 437-M).

In an embodiment, the source electronic device may obtain a screen and audio output from each of the displays and speakers of the source electronic device based on the screen mirroring source manager 410. For example, the source electronic device may capture the entire display area of the display (e.g., the display 342 of FIG. 3) of the source electronic device using the screen mirroring source manager 410. For example, the source electronic device may obtain audio output from a speaker (e.g., speaker 352 of FIG. 3) of the source electronic device using the screen mirroring source manager 410.

The source electronic device according to an embodiment may manage all one or more applications executed based on the mirroring function based on the source container manager 420. For example, using the source container manager 420, the source electronic device may create or/or remove a source application container, which is an instance corresponding to each of the one or more applications. For example, using the source container manager 420, the source electronic device may process a request received from a remote electronic device and related to execution and/or termination of an application stored in the source electronic device. In an embodiment, the source container manager 420 may be referred to as an application execution container manager. The event may include, for example, an event for receiving a request to execute an application stored in the source electronic device. Since the source container manager 420 corresponds to the remote container manager 425, the remote electronic device may transmit a request to execute an application selected by a user of the remote electronic device to the source container manager 420 running in the source remote device based on the remote container manager 425. The source electronic device may obtain a source application container corresponding to the request using the source container manager 420.

For example, when a source application container 422-1 is generated in response to the request, the source electronic device may transmit information related to the source application container 422-1 to the remote container manager 425 of the remote electronic device using the source container manager 420. The information may include at least one of a package name of an application corresponding to the request, a user ID (UID) or a task ID (Task ID) assigned to the application by system service 440 as an identifier assigned to the source application container 422-1. The source application container 422-1 may be executed to transmit a screen and/or audio of an application corresponding to the request to a remote electronic device, as described in greater detail below with reference to FIG. 5.

In an embodiment, the source electronic device may process at least a portion of a user input detected by the remote electronic device as it performs a mirroring function based on the source container manager 420. For example, a user of a remote electronic device may perform a user input for controlling an application provided through the remote electronic device and executed in the source electronic device based on the source application container 422-1. In this case, the remote electronic device may transmit a signal notifying the user input to the source electronic device using the remote application container 427-1 corresponding to the source application container 422-1.

In response to receiving the signal, the source electronic device may notify the source application container 422-1 of the occurrence of the user input according to the signal based on the source container manager 420. Similarly, when a user of the source electronic device performs a user input for controlling an application corresponding to the source application container 422-1, the source electronic device may identify a source application container 422-1 for processing an event corresponding to the user input based on the source container manager 420.

The source electronic device according to an embodiment may control one or more sessions formed based on the connection 220 between the source electronic device and the remote electronic device using one or more source application containers. In an embodiment, the source application container may be referred to as an Application Execution Container. The one or more sessions may be referred to as, for example, a mirroring session, a screen mirroring session, and/or a screen streaming session, as a logical link established corresponding to each of one or more applications of a source electronic device that remote electronic device executes based on a mirroring function. Referring to FIG. 4, N source application containers (422-1, 422-2, . . . , 422-N) generated by the source electronic device on which the source container manager 420 is executed may be executed in the source electronic device and correspond to N applications provided to the remote electronic device as N mirroring sessions and/or screen streaming sessions. Through each of the N mirroring sessions, a video signal indicating a screen obtained by the source electronic device from the application based on the source application container may be transmitted.

In an embodiment, the source electronic device may store information corresponding to each of the one or more source application containers in a memory (e.g., the memory 322 of the electronic device 101 of FIG. 3). The information may be stored in a portion of a memory assigned to a corresponding source application container. For example, the source application container running on the source electronic device may be uniquely assigned information using the source container manager 420 and may include at least one of an identifier (ID), a package name of a corresponding application, a task ID, and a UID. The information assigned to the source application container may be used, for example, to indicate a source application container corresponding to a signal to be transmitted to the remote electronic device. The information assigned to the source application container may be used in the remote electronic device to identify the remote application container corresponding to the source application container. For example, information assigned to the source application container may indicate mapping between the source application container and the remote application container.

The source electronic device according to an embodiment may manage all one or more audio signals distinguished by a mirroring session and transmitted to the remote electronic device based on the source audio manager 430. For example, using the source audio manager 320, the source electronic device may generate or/and remove source audio, which is an instance corresponding to each of the one or more audio signals. In an embodiment, the source audio manager 430 may be referred to as an audio redirector source manager. For example, when the remote electronic device requests streaming of audio for a specific application based on the remote audio manager 435, the source electronic device may obtain source audio related to the specific application.

For example, when the source audio 432-1 may be generated according to the request, the source electronic device may transmit information related to the source audio 432-1 to the remote audio manager 435 of the remote electronic device using the source audio manager 430. The information may include an identifier uniquely assigned to the audio 432-1 by the source audio manager 430. The identifier may include at least one of a UID of the specific application, a package name, and/or a task ID allocated by the system service 440 as the specific application is executed. The identifier may indicate a mapping between source audio and remote audio.

The source electronic device according to an embodiment, using one or more source audio, may be formed based on a connection 220 between the source electronic device and the remote electronic device and may control one or more sessions for transmitting audio. In an embodiment, the source audio may be referred to as an audio director source. In an embodiment, the one or more sessions may correspond to each of the one or more mirroring sessions. In an embodiment, the one or more sessions may be referred to as an audio mirroring session and/or an audio streaming session as independent of the mirroring session. Referring to FIG. 4, M source audios (432-1, . . . , and 432-M) generated by the source electronic device using the source audio manager 430 are illustrated. In one example of FIG. 4, the number M of source audios (432-1, . . . , 432-M) and the number N of source application containers (422-1, 422-2, . . . , 422-N) may match or vary according to embodiments. Through the audio streaming session, the source electronic device may transmit an audio signal including an identifier of the source audio to the remote electronic device using the source audio.

For example, an application running on the source electronic device may generate one or more screens and/or windows. In an example state in which the source electronic device transmits a plurality of screens obtained from a single application to the remote electronic device, a plurality of source application containers may be generated corresponding to each of the plurality of screens. In the example state, in an embodiment in which the source electronic device generates source audio based on the UID as the UID is uniquely assigned to the single application, the source electronic device may generate a single source audio corresponding to the single application. When the source electronic device uses the single source audio, the remote electronic device may receive a single audio signal in which audio signals corresponding to each of a plurality of screens obtained from the single application are merged. In the above example, the number of source audio and the number of source application containers may be different from each other. However, the embodiment is not limited thereto.

The source electronic device according to an embodiment may request one or more audio signals to be transmitted to the remote electronic device through one or more source audios to the system service 440 using one or more source audios. The request for an audio signal may include, for example, an operation of combining a plurality of audio signals corresponding to each of a plurality of applications. Combining the plurality of audio signals may be referred to as mixing and/or synthesizing. For example, the source electronic device may request information (e.g., an audio mixing rule and/or an audio mixing policy) used for mixing a plurality of audio to the audio policy service 470 using the source audio. The information may be set for each of an operating system and/or a plurality of applications of the source electronic device by the audio policy service 470. For example, the source electronic device may request the audio policy service 470 to change the audio mixing rule in order to independently obtain audio signals corresponding to each of a plurality of applications executed based on a mirroring function. The request may include a request for adjusting one or more volumes corresponding to each of the one or more audio signals used for mixing, and/or a request for adjusting signal paths of the plurality of audio signals differently. The source electronic device according to an embodiment may mix a plurality of audios based on the information managed by the audio policy service 470 using the audio flinger 460 included in the system service 440.

The remote electronic device according to an embodiment may obtain a screen and audio output from each of the display and speaker of the source electronic device based on the screen mirroring sink manager 415 corresponding to the screen mirroring source manager 410 of the source electronic device. For example, the remote electronic device may display the screen obtained using the screen mirroring sink manager 415 on at least a portion of the display of the remote electronic device. In a state of displaying the screen corresponding to the display of the source electronic device, the remote electronic device may output audio obtained using the screen mirroring sink manager 415 through a speaker.

The remote electronic device according to an embodiment may manage one or more mirroring sessions corresponding to each of one or more applications executed in the source electronic device based on the mirroring function based on the remote container manager 425. The remote container manager 425 executed in the remote electronic device may correspond to the source container manager 420 executed in the source electronic device. In an embodiment, the remote container manager 425 may be referred to as a remote application container manager.

For example, using the remote container manager 425, the remote electronic device may create or/and remove a remote application container, which is an instance corresponding to each of the one or more applications. For example, the remote electronic device may transmit a request to execute an application, share a screen of the application, and/or stop the execution of the application to the source electronic device using the remote container manager 425. For example, in response to receiving a request to execute an application, the source electronic device may transmit information related to the source application container obtained using the source container manager 420 corresponding to the remote container manager 425. In response to receiving the information, the remote electronic device may generate a remote application container corresponding to the source application container based on the information using the remote container manager 425. The remote electronic device may transmit data transmitted by the source electronic device based on a specific source application container to a remote application container corresponding to the specific source application container based on the mapping between the remote application container and the source application container appearing by the remote container manager 425.

The remote electronic device according to an embodiment may perform communication based on one or more mirroring sessions formed based on the connection 220 between the source electronic device and the remote electronic device using one or more remote application containers. Referring to FIG. 4, N remote application containers (427-1, 427-2, . . . , 427-N) corresponding to each of the N source application containers (422-1, 422-2, . . . , 422-N) generated by the source electronic device are illustrated. For example, the remote electronic device may obtain one or more remote application containers having one-to-one correspondence with one or more source application containers running on the source electronic device, at least based on the remote container manager 425. The remote electronic device according to an embodiment may allocate a unique identifier to each of the N remote application containers (427-1, 427-2, . . . , 427-N) based on the remote container manager 425. Based on the identifier, N remote application containers (427-1, 427-2, . . . , 427-N) may correspond to each of N source application containers (422-1, 422-2, . . . , 422-N).

The remote electronic device according to an embodiment may manage all of one or more audio signals received from the source electronic device based on the remote audio manager 435. For example, using the remote audio manager 435, the remote electronic device may generate or/and remove remote audio for receiving the one or more audio signals. In an embodiment, the remote audio manager 435 may be referred to as an Audio Redirector Sink Manager. In an embodiment, the remote electronic device may obtain remote audio for processing streaming of audio, requested from the screen mirroring sink manager 415 and/or one or more remote application containers, using the remote audio manager 435. The remote electronic device may transmit an audio signal received from the source electronic device to a corresponding remote audio.

The remote electronic device according to an embodiment may control one or more sessions formed based on the connection 220 between the source electronic device and the remote electronic device for receiving audio, using one or more remote audio. In an embodiment, remote audio may be referred to as an Audio Redirector Sink. The one or more sessions controlled by remote audio may be referred to as audio streaming sessions. Referring to FIG. 4, M remote audio (437-1, . . . , and 437-M) generated by the remote electronic device using the remote audio manager 435 are illustrated. In an example of FIG. 4, M remote audio (437-1, . . . , and 437-M) may correspond to each of the source audio (432-1, . . . , and 432-M). For example, the electronic device may allocate different identifiers to M remote audio (437-1, . . . , 437-M) using the remote audio manager 435. The identifiers may match the identifier of the source audio corresponding to the remote audio displayed by the identifier.

In the example of FIG. 4, between N source application containers (422-1, 422-2, . . . , 422-N) and N remote application containers (427-1, 427-2, . . . , 427-N), N screen streaming sessions for streaming N video signals representing N screens obtained from one or more applications running on the source electronic device may be established.

In an example of FIG. 4, M source audios (432-1, . . . , 432-M) between M remote audios (437-1, . . . , 437-M), M audio streaming sessions for streaming M audio signals obtained from the one or more applications running in the source electronic device may be established. The screen streaming sessions and the audio streaming sessions may correspond to each other based on the one or more applications. As audio signals obtained from each of the at least M applications, which are running on the source electronic device, are individually transmitted, the remote electronic device may independently output the received audio signals through M audio streaming sessions.

As described above, in order to support the mirroring function, the source electronic device and the remote electronic device according to an embodiment may execute programs 372 and 374 operating based on one or more corresponding instances. The connection 220 established between the source electronic device and the remote electronic device executing each of the programs 372 and 374 may include one or more screen streaming sessions and/or one or more audio streaming sessions. One or more screen streaming sessions may be displayed through a remote electronic device and correspond to each of the different screens provided from the source electronic device. For example, the different screens may include a first screen displayed on the display of the source electronic device and/or one or more second screens executed by the source electronic device in response to a request from the remote electronic device and distinguished from the first screen. One or more audio streaming sessions may correspond to each of the different audio signals output through the remote electronic device and provided from the source electronic device. For example, the audio signals may include a first audio signal indicating a first audio output through a speaker of a source electronic device and/or one or more second audio signals executed by the source electronic device in response to a request from the remote electronic device and distinguished from the first audio signal.

Hereinafter, an operation performed by the source electronic device executing the program 372 will be described in greater detail with reference to FIG. 5.

Figure 5:
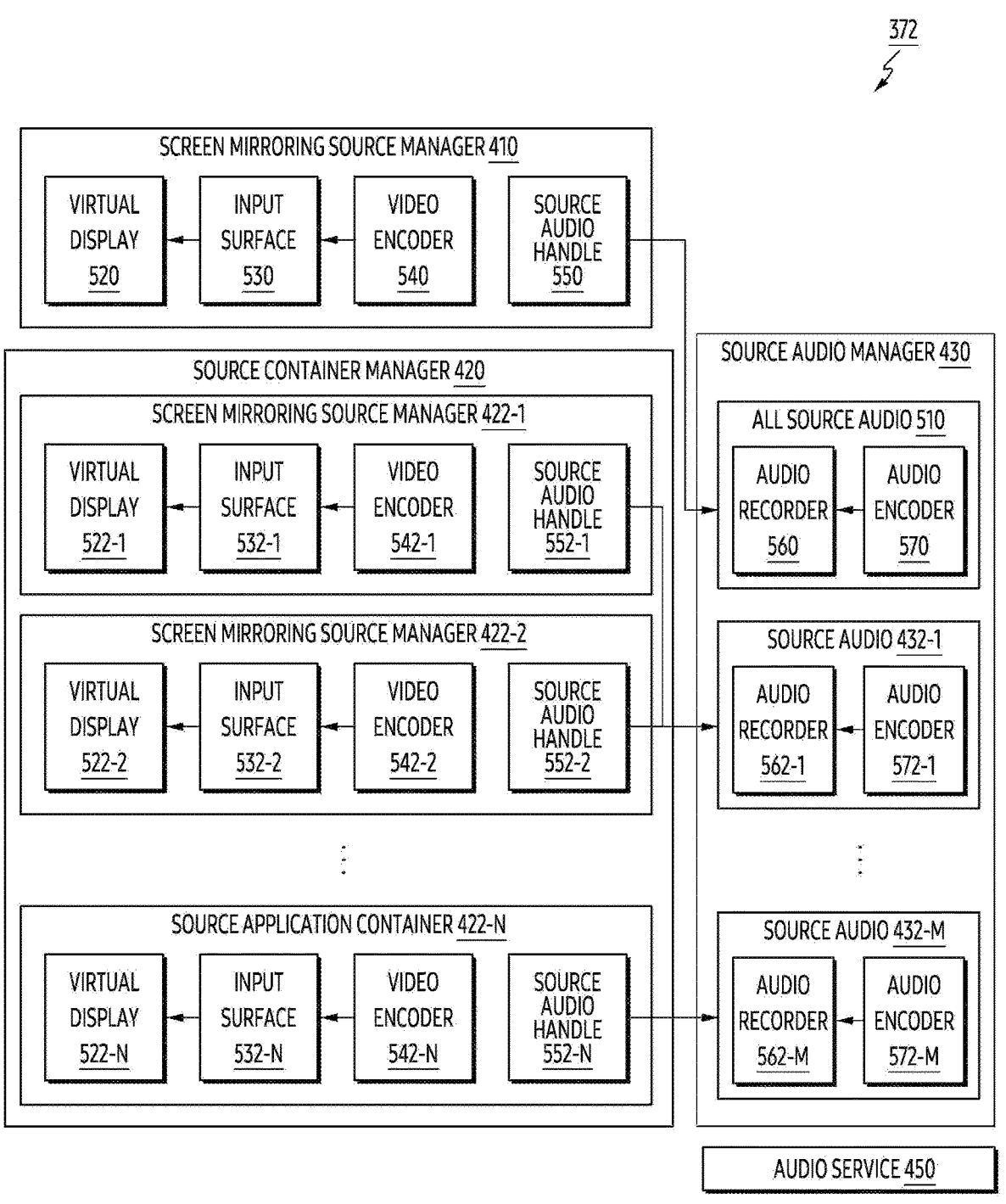
FIG. 5 is a diagram illustrating an example configuration of a program executed by an electronic device for controlling audio provided from one or more applications executed in the electronic device according to various embodiments.

FIG. 5 is a diagram illustrating an example configuration of a program 372 executed by an electronic device for controlling audio provided from one or more applications executed by the electronic device according to various embodiments. The electronic device of FIG. 5 may correspond to an example of the electronic device 101 of FIGS. 1 to 3 and/or the source electronic device of FIG. 4. The program 372 of FIG. 5 may correspond to an example of the program 372 related to the source electronic device of FIG. 4.

Referring to FIG. 5, as a plurality of instances executed by an electronic device based on a program 372, screen mirroring source manager 410, source container manager 420, N source application containers (422-1, 422-2, . . . , 422-N), source audio manager 430, M source audio (432-1, . . . , 432-M), and audio service 440 are shown. As described above with reference to FIG. 4, the N source application containers (422-1, 422-2, . . . , 422-N) may correspond to each of the N screen streaming sessions. The M source audio (432-1, . . . , and 432-M) may correspond to each of the M audio streaming sessions. Hereinafter, a description overlapping with FIG. 4 among one or more instances executed by the electronic device based on the program 372 may not be repeated for convenience.

Referring to FIG. 5, the electronic device according to an embodiment may provide multimedia content provided through a display and a speaker of the electronic device to another electronic device (e.g., the electronic device 210 of FIG. 3) using the screen mirroring source manager 410. For example, the electronic device may obtain all audio provided from the electronic device based on the screen mirroring source manager 410. The electronic device according to an embodiment may execute a mirroring function related to the multimedia content based on the virtual display 520, the input surface 530, the video encoder 540, and/or the source audio handle 550 included in the screen mirroring source manager 410. For example, the virtual display 520 and the input surface 530 included in the screen mirroring source manager 410 may relate to a frame buffer in which screens of one or more applications running based on a display area of a display of an electronic device are rendered. The frame buffer may correspond to a part selected in a memory included in an electronic device, for example, based on a system service such as a surface flinger (not shown). For example, the input surface 530 may provide a virtual display 520 in which the screen is rendered, based on the frame buffer provided from the surface flinger, to the one or more applications. The electronic device may encode a screen corresponding to the entire display area of the display obtained through the virtual display 520 and the input surface 530 using the video encoder 540 and obtain a video signal to be transmitted to another electronic device.

The electronic device according to an embodiment may identify full source audio 510 managed by the source audio manager 430 using the source audio handle 550 of the screen mirroring source manager 410. Hereinafter, the entire source audio 510 may be referred to as a full audio redirector source. The entire source audio 510 is an instance in which the electronic device runs using the source audio manager 430 and may correspond to an instance for obtaining audio output from all applications running on the electronic device. For example, the entire source audio 510 may refer to an instance for streaming audio combinations output from all applications running on the electronic device to another electronic device. The entire source audio 510 may be generated in response to a request to transmit a screen displayed in the electronic device from another electronic device by the electronic device on which the source audio manager 430 is executed.

Referring to FIG. 5, The electronic device according to an embodiment may provide a screen and audio of an application corresponding to the source application container to another electronic device using virtual displays (e.g., virtual displays (522-1, 522-2, . . . , 522-N)) included in the source application container, input surfaces (e.g., input surfaces (532-1, 532-2, . . . , 532-N)), video encoders (e.g., video encoders (542-1, 542-2, . . . , 542-N)) and source audio handles (e.g., source audio handles (552-1, 552-2, . . . , 552-N)). The virtual display, input surface, and video encoder included in the source application container may operate similarly to each of the virtual display 520, input surface 530, and video encoder 540 of the screen mirroring source manager 410 for the screen of the application corresponding to the source application container. For example, the virtual display 522-1 and the input surface 532-1 may include information used to render a screen of an application corresponding to the source application container 422-1 to another frame buffer different from the frame buffer corresponding to the display area of the electronic device. The electronic device may obtain a video signal indicating a screen rendered in the virtual display 522-1 by an application corresponding to the source application container 422-1 using the video encoder 542-1. The video signal may be streamed to another electronic device based on an identifier assigned to the source application container 422-1.

The electronic device according to an embodiment may identify source audio connected to the source application container based on a source audio handle included in the source application container. For example, the electronic device may identify the source audio 432-1 that obtains audio provided from an application corresponding to the source application container 422-1 using information stored in the source audio handle 552-1. Referring to FIG. 5, a plurality of source audio handles 552-1 and 552-2 may represent one source audio 432-1. For example, when a specific application generates a plurality of screens, the electronic device may obtain a plurality of source application containers 422-1 and 422-2 corresponding to each of the plurality of screens based on the source container manager 420. In the above example, when the electronic device generates a UID uniquely allocated to a specific application, the electronic device may generate a single source audio 432-1 corresponding to the specific application using the source audio manager 430. In this case, the electronic device may connect the source application containers 422-1 and 422-2 to the source audio 432-1 using the source audio handles 552-1 and 552-2. In this case, a plurality of source application containers 422-1 and 422-2 may be distinguished based on a display ID and/or a task ID allocated to each of a plurality of screens.

Referring to FIG. 5, the entire source audio 510 and M source audio 432-M generated by the electronic device based on the source audio manager 430 may include audio recorders (e.g., audio recorders 560, 562-1, . . . , 562-M) and audio encoders 570, 572-1, . . . , 572-M). The electronic device may combine one or more applications connected to the source audio and/or one or more audio signals corresponding to screens using the audio recorder. The electronic device combining and/or obtaining audio signals using an audio recorder may be performed based on information provided through the audio service 450 and guiding audio mixing. The electronic device may obtain an audio signal to be transmitted to another electronic device by encoding the combined audio signal using the audio encoder. For example, the electronic device may combine one or more audio signals obtained from all applications running in the electronic device using the audio recorder 560 included in the entire source audio 510. The electronic device may obtain an audio signal to be transmitted to another electronic device from an audio signal coupled by the audio recorder 560 using the audio encoder 570.

Referring to FIG. 5, the electronic device may combine audio signals corresponding to screens corresponding to each of the source application containers 422-1 and 422-2 connected to the source audio 432-1 using an audio recorder 562-1. The screens may be, for example, screens generated by the first application. The electronic device may encode the audio signal combined by the audio recorder 562-1 using the audio encoder 572-1 corresponding to the audio recorder 562. The audio signal encoded based on the audio encoder 572-1 may be transmitted from the electronic device to another electronic device based on information uniquely allocated to the source audio 432-1. Similarly, using an audio recorder (562-M), the electronic device may obtain an audio signal provided from a second application that corresponds to the source application container 422-N connected to the source audio 432-M and is distinct from the first application. The electronic device may encode the audio signal obtained using the audio recorder 562-M using the audio encoder 572-M. The audio signal encoded based on the audio encoder 572-M is different from the information allocated to the source audio 432-1 and may be transmitted to another electronic device based on the information allocated to the source audio 432-M by the source audio manager 430.

As described above, the electronic device according to an embodiment may at least partially combine audio signals corresponding to each of a plurality of applications being executed on the electronic device, and/or transmit the audio signals to another electronic device by executing the program 372. In this case, the electronic device may independently transmit a plurality of audio signals to another electronic device using distinguished audio streaming sessions. A plurality of independently transmitted audio signals may be independently controlled by another electronic device and reproduced by another electronic device based on a plurality of volumes allocated to each of the plurality of audio signals.

Hereinafter, an operation in which an electronic device according to an embodiment mixes audio signals obtained from applications executed in the electronic device at least partially will be described in greater detail with reference to FIG. 6.

Figure 6:
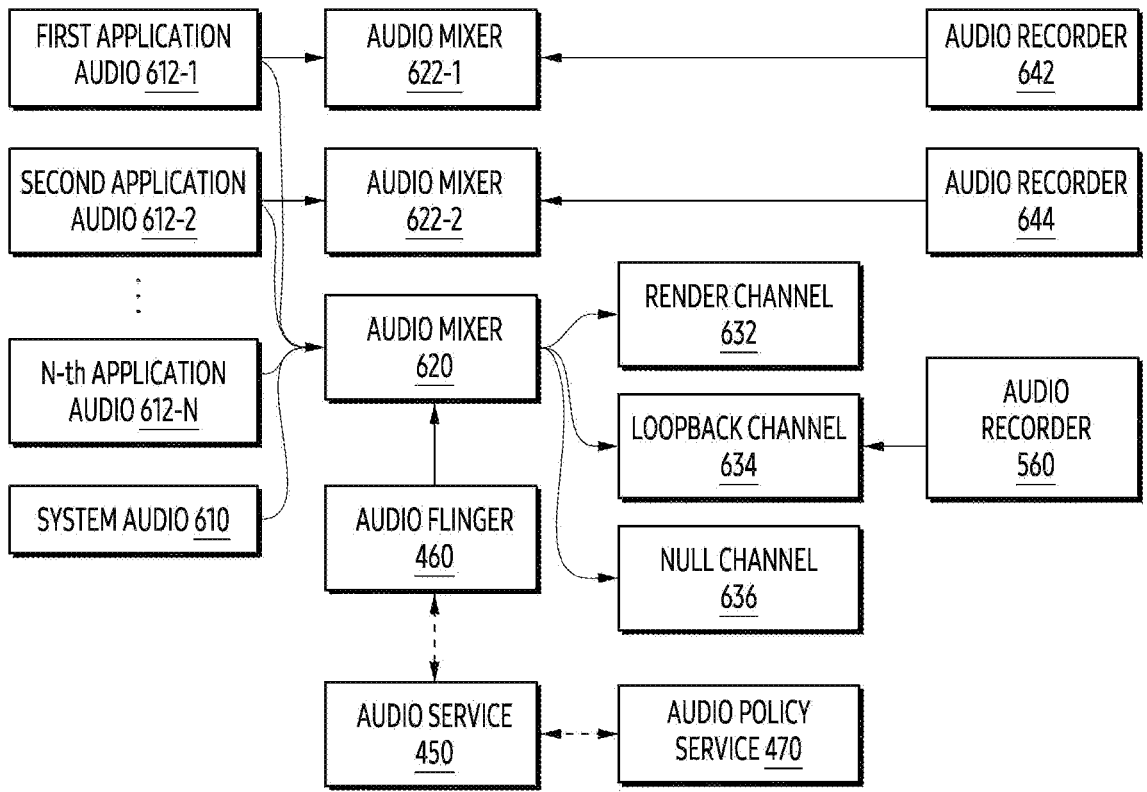
FIG. 6 is a diagram illustrating an example operation of mixing audio signals obtained by an electronic device in a plurality of applications running in the electronic device according to various embodiments.

FIG. 6 is a diagram illustrating an example operation of mixing audio signals obtained by an electronic device in a plurality of applications running in the electronic device according to various embodiments. The electronic device of FIG. 6 may correspond to an example of the electronic device 101 of FIGS. 1 to 3 and/or the source electronic device of FIG. 4.

Referring to FIG. 6, signal paths corresponding to audio (612-1, 612-2, . . . , 612-N) generated in each of N applications running in an electronic device, and/or system audio 610 generated from the operating system (e.g., the operating system 142 of FIG. 1) and/or middleware (e.g., middleware of FIG. 1) of the electronic device are illustrated. The signal path may be related to a data stream and/or audio signals corresponding to each of the audio (612-1, 612-2, . . . , 612-N) and the system audio 610. The signal path is a logical signal path formed in the electronic device, and may be generated by, for example, an electronic device executing the program 372 of FIGS. 4 to 5. An audio signal corresponding to the above-described audio through the signal path may be transmitted to another electronic device distinguished from a speaker of the electronic device and/or an electronic device. For example, the audio service 450, the audio flinger 460, and the audio policy service 470 of FIG. 6 may correspond to each of the audio service 450, the audio flinger 460, and the audio policy service 470 included in the program 372 of FIG. 4.

The electronic device according to an embodiment may obtain an audio signal to be provided to a speaker of the electronic device and/or another electronic device by adjusting signal paths corresponding to each of the audio (612-1, 612-2, . . . , 612-N) and the system audio 610, or mixing a plurality of audio signals transmitted to a single audio mixer (e.g., audio mixer 620). The signal path may be determined based on, for example, the source audio handles (550, 552-1, 552-2, . . . , 552-N) of FIG. 5.

Hereinafter, referring to FIG. 6, in a state in which the electronic device streams a plurality of screens and audio signals corresponding to the screens based on a mirroring function to another electronic device, an operation of adjusting signal paths related to each of a plurality of applications executed in the electronic device will be described. For example, it is assumed that the electronic device individually transmits a first screen corresponding to the first application, a second screen corresponding to the second application, and a third screen corresponding to the display area of the display.

Referring to FIG. 6, audio mixers 622-1, 622-2, and 620 corresponding to at least one of audio (audio 612-1, 612-2, . . . , 612-N and system audio 610) distinguished by applications and operating systems running in an electronic device are illustrated. The audio mixers (622-1, 622-2, and 620) are instances executed in an electronic device and may be executed to mix one or more audio signals input to the audio mixer based on information (e.g., information indicating an audio mixing rule) provided from the audio flinger 460.

In an embodiment, the audio mixers 622-1, 622-2, and 620 may correspond to each of one or more source audios (e.g., the entire source audio 510 of FIG. 5 and/or source audios 432-1, . . . , 432-M). Referring to FIG. 6, the audio mixer 620 related to all audio (e.g., audio generated in N applications 612-1, 612-2, . . . , 612-N and system audio 610) generated in the electronic device may correspond to, for example, the entire source audio 510 corresponding to the screen mirroring source manager 410 of FIG. 5.

Among all the audio, the audio mixer 622-1 receiving the audio 612-1 generated in the first application may correspond to a source audio corresponding to the first application and an audio recorder 642 of the source audio. Among all the audio, the audio mixer 622-2 receiving the audio 612-2 generated in the second application may correspond to a source audio corresponding to the second application and an audio recorder 644 of the source audio. For example, the electronic device may be assigned to each of the audio mixers 622-1 and 622-2 and may identify a mapping between the audio mixers 622-1, 622-2 and the audio 612-1, 612-2 using different UID s corresponding to each of the first and second applications. Audio signals corresponding to audio of each of the first application and the second application may be generated by the audio mixers 622-1, 622-2. The electronic device may generate audio signals corresponding to each of the audio 612-1, 612-2 along a specified volume (e.g., maximum volume) based on the audio mixers 622-1, 622-2.

The generated audio signals may be transmitted to audio recorders (642, 644) corresponding to each of the audio mixers 622-1, 622-2. The electronic device may transmit the audio signals to another electronic device based on source audio corresponding to each of the audio recorders (642 and 644). For example, the first audio signal generated by the audio mixer 622-1 related to the first application mat be to be transmitted to another electronic device independently of other audio signals generated by the other audio mixers 622-2, 620. For example, the first audio signal may be generated independently of other audio of other applications distinguished from the first application.

The electronic device according to an embodiment may output an audio signal obtained using the audio mixer 620 related to all audio (e.g., audio 612-1, 612-2, . . . , 612-N generated in N applications and system audio 610) along any one of the designated channels. Referring to FIG. 6, the designated channels may include at least one of a render channel 632 which is a logical channel corresponding to a speaker of an electronic device, loopback channel 634, which is a logical channel distinguished from the render channel 632, and used to obtain an audio signal independently of a speaker, or null channel 636, which is a logical channel for discarding an audio signal. The loopback channel 634 may have a designated identifier such as REMOTE_SUBMIX, for example. The connection between the audio mixer 620 and the designated channels may be switched based on, for example, an audio service 450 executed in the electronic device and/or an audio flinger 460.

In a state of transmitting a third screen corresponding to a display area of a display to another electronic device according to an example embodiment, the electronic device may allocate an audio signal mixed by the audio mixer 620 to the loopback channel 634 among the designated channels. Referring to FIG. 6, as the audio recorder 560 of the entire source audio 510 corresponding to the screen mirroring source manager 410 of FIG. 5 matches the loopback channel 634, the audio signal allocated to the loopback channel 634 may be transmitted to another electronic device. In this case, as the audio signal mixed by the audio mixer 620 is transmitted to the loopback channel 634 distinguished from the render channel 632, the electronic device may stop playing audio through the speaker. In a state in which the electronic device stops playing audio through the speaker, another electronic device may initiate playback of audio provided from the electronic device based on the loopback channel 634.

The electronic device according to an embodiment may exclude the first application corresponding to other audio mixers 622-1 and 622-2 and audio 612-1, 612-2 corresponding to each of the second applications from audio signals mixed by the audio mixer 620 based on information stored in the audio policy service 470 and provided from the audio service 450 through the audio flinger 460. For example, using the information provided to the audio mixer 620, For example, the electronic device may make a volume (e.g., a mixing volume) to be combined with each of the audios 612-1 and 612-2 received by the audio mixer 620 to be substantially zero. In this case, in the audio mixer 620, audio 612-1 and 612-2 may be muted among all the audio, and other audio may have a designated volume that is distinguished from mute. As the audio 612-1 and 612-2 are muted, the audio mixer 620 may output an audio signal mixed with audio other than the audio 612-1 and 612-2 among all the audio. Referring to FIG. 6, the output audio signal may be transmitted to the audio recorder 560 along the loopback channel 634.

In an embodiment, based on the information provided from the audio service 450 to the audio mixer 620, the electronic device may make the signal path of the audio mixer 620 of the audio 612-1 and 612-2 corresponding to the other audio mixers 622-1 and 622-2 different from other audio distinguished from the audio 612-1 and 612-2. For example, the electronic device may allocate a signal path corresponding to the audio 612-1 and 612-2 in the audio mixer 620 to another channel (e.g., null channel 636) distinguished from the loopback channel 634. In a state in which a signal path corresponding to the audio 612-1 and 612-2 is allocated to the other channels (e.g., null channel 636), the electronic device may allocate a signal path of another audio distinguished from the audio 612-1 and 612-2 to the loopback channel 634. In this case, as audio signals corresponding to the audio 612-1 and 612-2 are transmitted to another channel distinguished from the loopback channel 634 through the audio mixer 620, audio signals corresponding to the audio 612-1 and 612-2 may be stopped from being transmitted to the loopback channel 634.

As described above, while the electronic device according to an embodiment maintains audio recording by each of the audio recorders 642, 644, and 560 corresponding to each of the audio mixers 622-1, 622-2, and 620 using the information provided to the audio mixer 620, making the mixing volume and/or signal path corresponding to the audio 612-1 and 612-2 different from the mixing volume and/or signal path corresponding to other audio may be performed. For example, to another electronic device, in a state of streaming all applications of the electronic device and all audio generated in the operating system based on the audio mixer 620, the electronic device may initiate streaming of audio based on other audio mixers 622-1 and 622-2 without stopping the streaming (e.g., restarting and/or reproducing the audio streaming session). For example, the electronic device may generate and/or remove a specific audio streaming session without interruption of streaming based on another audio streaming session. Referring to FIG. 6, as mixing of audio 612-1 and 612-2 having a plurality of signal paths connected to a plurality of audio mixers is performed by a substantially single audio mixer, audio signals obtained by the electronic device from audio recorders 642, 644, and 560 corresponding to each of a plurality of audio mixers 622-1, 622-2, and 620 may include distinct audio. For example, the audio signal obtained by the electronic device from the audio recorder 560 may include other audio distinguished from the audio 612-1 and 612-2. For example, the audio signal obtained by the electronic device from the audio recorder 644 may exclusively include an audio signal corresponding to the audio 612-2. For example, the audio signals may be generated by the electronic device so that audio is not double-output from another electronic device that reproduces the audio signals.

Hereinafter, an operation performed by the electronic device executing the program 374 of FIG. 4 will be described in greater detail with reference to FIG. 7.

Figure 7:
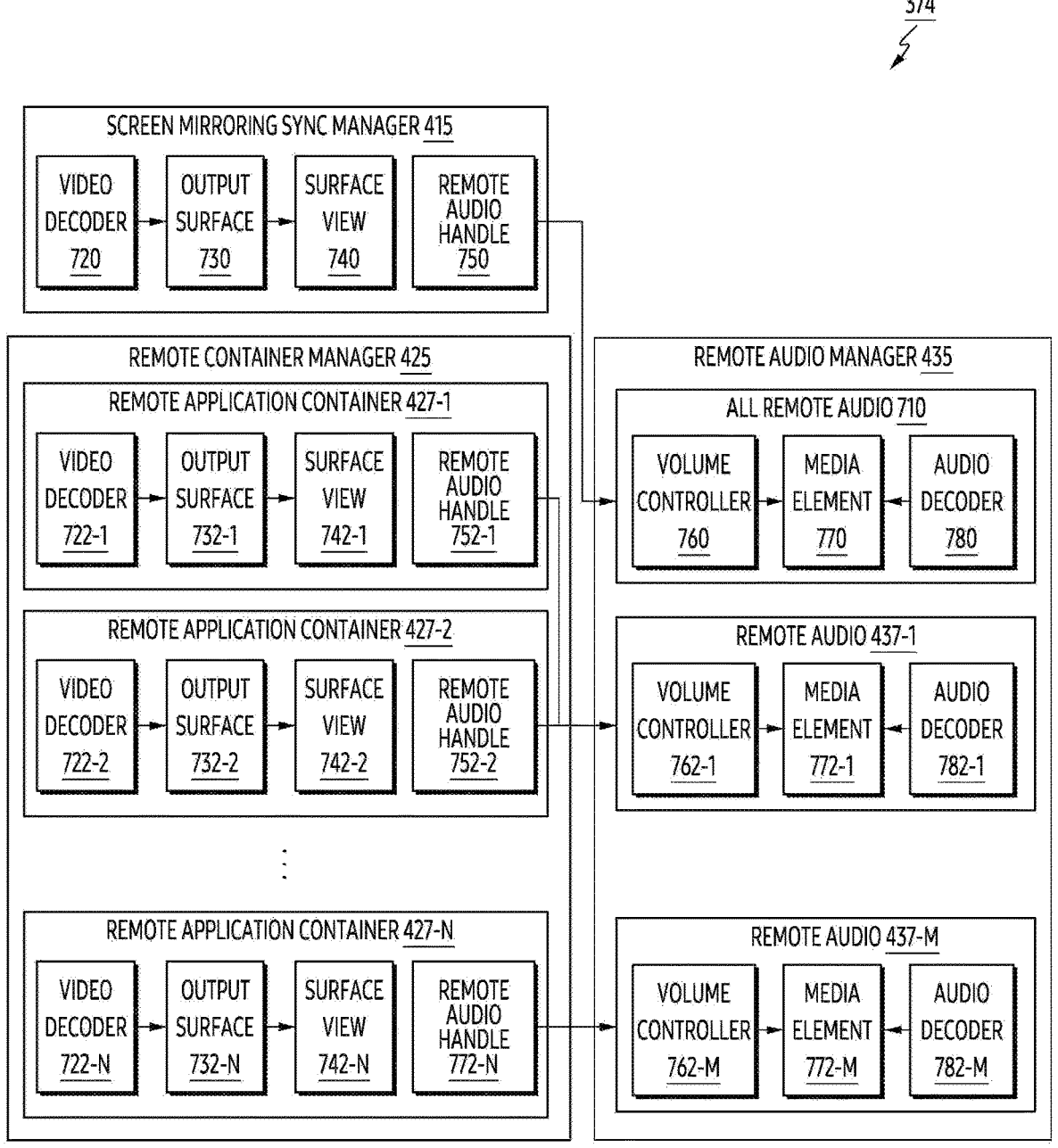
FIG. 7 is a diagram illustrating an example configuration of a program executed by an electronic device to receive audio provided from one or more applications executed by another electronic device, according to various embodiments.

FIG. 7 is a diagram illustrating an example configuration of a program 374 executed by an electronic device to receive audio provided from one or more applications executed by another electronic device according to various embodiments. The electronic device of FIG. 7 may correspond to an example of the electronic device 210 of FIGS. 1 to 3 and/or the remote electronic device of FIG. 4. The other electronic device of FIG. 7 may correspond to an example of the electronic device 101 of FIGS. 1 to 3 and/or the source electronic device of FIG. 4. The program 374 of FIG. 7 may correspond to an example of the program 374 related to the remote electronic device of FIG. 4.

Referring to FIG. 7, as a plurality of instances executed by an electronic device based on a program 374, screen mirroring sink manager 415, remote container manager 425, N remote application containers 427-1, 427-2, . . . , 427-N, remote audio manager 435, and M remote audio 437-1, . . . , 437-M are shown. As described above with reference to FIG. 5, the N remote application containers 427-1, 427-2, . . . , and 427-N may correspond to each of the N screen streaming sessions. The M remote audio 437-1, . . . , and 437-M may correspond to each of the M audio streaming sessions. Hereinafter, it is assumed that another electronic device distinguished from the electronic device executing the program 374 operates based on an example of FIG. 5. Hereinafter, among one or more instances executed by the electronic device based on the program 374, descriptions overlapping those of FIGS. 4 to 6 may not be repeated for convenience.

Referring to FIG. 7, the electronic device according to an embodiment may obtain multimedia content provided from another electronic device (e.g., the electronic device 101 of FIG. 3) using the screen mirroring sink manager 415. The multimedia content may include, for example, video and audio output through at least one of a display or speaker of the other electronic device. The electronic device according to an embodiment may output the multimedia content based on a video decoder 720, an output surface 730, a surface view 740, and/or a remote audio handle 750 included in the screen mirroring sink manager 415. For example, a video signal generated based on a screen mirroring source manager (e.g., screen mirroring source manager 410 of FIGS. 4 to 5), corresponding to the screen mirroring sink manager 415, executed in another electronic device, may be transmitted to the electronic device. The electronic device may decode the video signal based on the video decoder 720 of the screen mirroring sink manager 415. The electronic device may obtain a surface view 740 in which a screen of another electronic device decoded by the video decoder 720 is rendered using the output surface 730 of the screen mirroring sink manager 415. The electronic device may display a screen rendered in the surface view 740 by the video decoder 720 on at least a portion of the display (e.g., the display 344 of FIG. 3) of the electronic device. The surface view 740 may be related to a frame buffer obtained by the electronic device based on the output surface 730.

The electronic device according to an embodiment may identify the entire remote audio 710 managed by the remote audio manager 435 using the remote audio handle 750. In an embodiment, the remote audio handle 750 may be referred to as an audio director handle, and the entire remote audio 710 may be referred to as a full audio redirector sink. The entire remote audio 710 may be an instance in which the electronic device runs using the remote audio manager 435 and correspond to an instance for reproducing a combination of audio output from all applications executed in other electronic devices in the electronic device. For example, in response to receiving a user input to stream a screen displayed on a display of another electronic device and audio corresponding to the screen, the entire remote audio 710 may be generated and executed by an electronic device based on the remote audio manager 435.

Referring to FIG. 7, an electronic device according to an embodiment may output video signals and/or one or more audio signals corresponding to one or more screens provided from another electronic device using video decoders (e.g., video decoders 722-1, 722-2, . . . , 722-N) included in the remote application container, output surfaces (e.g., output surfaces 732-1, 732-2, . . . , 732-N), surface views (e.g., Surface views 742-2, . . . , 742-N) and remote audio handles (e.g., remote audio handles 752-1, 752-2, . . . , 752-N). The video decoder, output surface, surface view, and remote audio handle included in the remote application container may operate similarly to each of the video decoder 720, output surface 730, surface view 740, and remote audio handle 750 for the screen of the application corresponding to the remote application container. For example, the electronic device may decode a video signal corresponding to the remote application container 427-1 using the video decoder 722-1. The electronic device may render a screen displayed by a video signal decoded in the surface view 742-1 obtained using the output surface 732-1.

The electronic device according to an embodiment may identify remote audio connected to the remote application container based on the remote audio handle included in the remote application container. For example, the electronic device may identify the remote audio 437-1 corresponding to the remote application container 427-1 using information stored in the remote audio handle 752-1. Similar to the above description in FIG. 5, when a specific application executed in another electronic device generates a plurality of screens, the electronic device may allocate a plurality of remote application containers 427-1 and 427-2 to each of the plurality of screens. A plurality of remote application containers 427-1 and 427-2 may be distinguished by, for example, task IDs allocated to each of the plurality of screens. The electronic device may generate remote audio 437-1 corresponding to the specific application based on the UID of the specific application using the remote audio manager 435. In this case, the remote audio handles 752-1 and 752-2 of a plurality of remote application containers 427-1 and 427-2 may be connected to the remote audio 437-1.

Referring to FIG. 7, the entire remote audio 710 and M remote audios 437-1, . . . , 437-M generated by the electronic device based on the remote audio manager 435 may include an audio decoder (e.g., audio decoders 780, 782-1, . . . , 782-M), media elements (e.g., media elements 770, 772-1, . . . , 772-M) and volume controllers (e.g., volume controllers 760, 762-1, . . . , 762-M). The electronic device may correspond to remote audio using an audio decoder and decode an audio signal transmitted from another electronic device. The electronic device may reproduce audio displayed by an audio signal decoded by the audio decoder using the media element. The electronic device may change the volume of audio played by the media element using a volume controller. The electronic device may display one or more visual objects for changing the volume on the display of the electronic device through a surface view corresponding to the volume controller using the volume controller. Referring to FIG. 7, volume controllers 760, 762-1, . . . , and 762-M may be executed to independently adjust the volumes of audio played by the entire remote audio 710 and M remote audio 437-1, . . . , 437-M, respectively.

Referring to FIG. 7, as the remote audio 437-1 corresponds to each of the remote application containers 427-1 and 427-2 corresponding to each of a plurality of screens generated by a specific application executed in another electronic device, the electronic device may adjust the volume of the entire audio corresponding to each of the plurality of screens using the volume controller 762-1 of the remote audio 437-1. The adjustment of the volume by the electronic device using the volume controller 762-1 may be performed independently of adjusting the volume of other audio related to the screen corresponding to the display area of the other electronic device based on the volume controller 760 of the entire remote audio 710.

As described above, the electronic device according to an embodiment may independently adjust reproduction of a plurality of audio signals provided from another electronic device using volume controllers (e.g., volume controllers 760, 762-1, . . . , 762-M) corresponding to each of the plurality of audio signals. Hereinafter, referring to FIG. 8, a UI displayed by an electronic device according to an embodiment to request the provision of a screen and audio to another electronic device based on a mirroring function will be described in greater detail.

Figure 8:
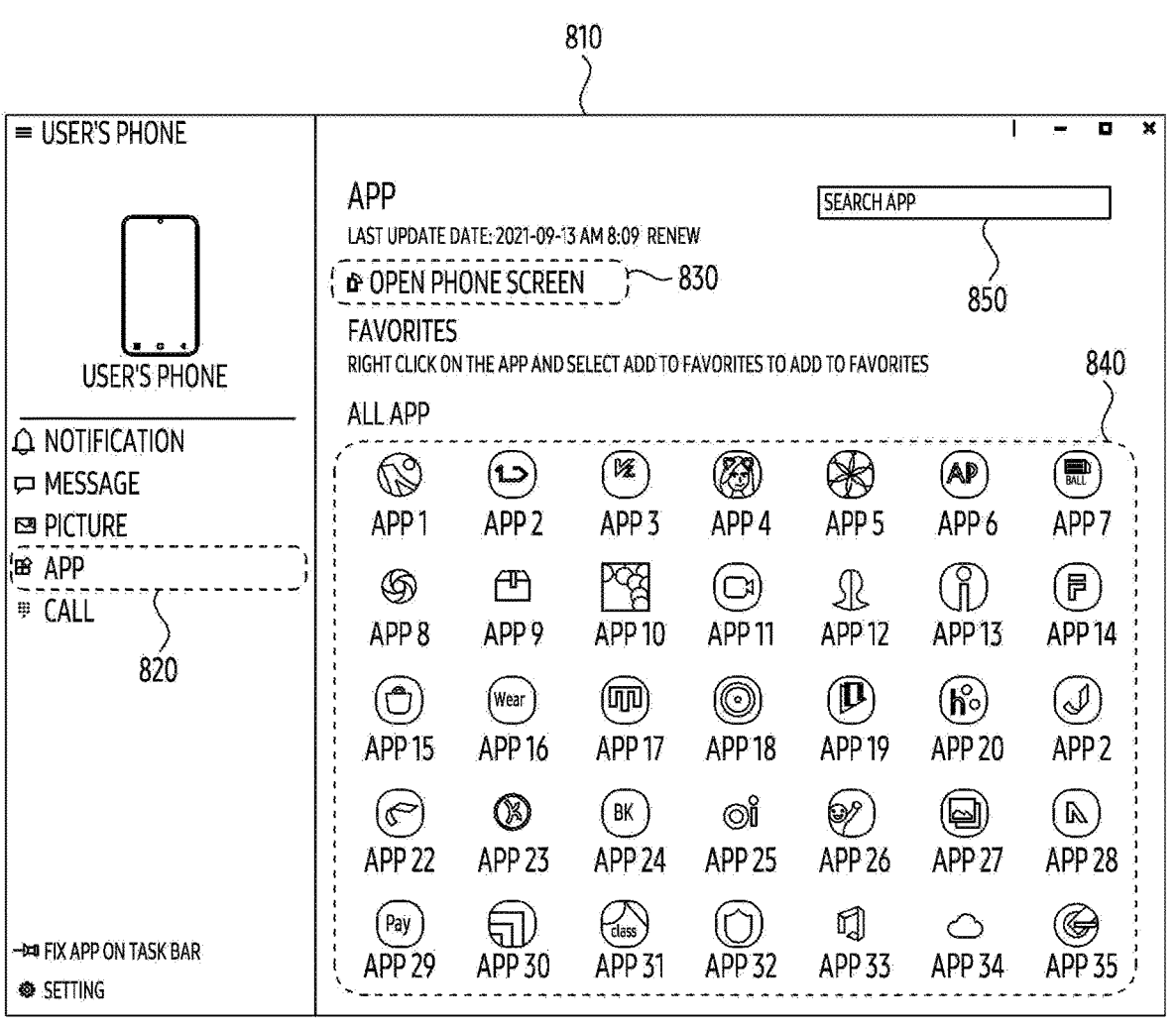
FIG. 8 is a diagram illustrating an example of a user interface (UI) displayed by an electronic device to execute one or more applications provided by another electronic device according to various embodiments.

FIG. 8 is a diagram illustrating an example user interface (UI) displayed by an electronic device to execute one or more applications provided by another electronic device according to various embodiments. The electronic device of FIG. 8 may correspond to an example of the electronic device 210 of FIGS. 1 to 3 and/or the remote electronic device of FIG. 4. The other electronic device of FIG. 8 may correspond to an example of the electronic device 101 of FIGS. 1 to 3 and/or the source electronic device of FIG. 4.

Referring to FIG. 8, a screen 810 displayed by an electronic device according to an embodiment to control another electronic device based on a mirroring function is illustrated. Within the screen 810, the electronic device may display information for indicating another electronic device (e.g., an identifier assigned to a user of the other electronic device and/or a type of the other electronic device), and/or at least a portion of information stored in the other electronic device. For example, in response to receiving a user input of touching and/or clicking visual object 820, the electronic device may display a list 840 of one or more applications stored in another electronic device and executable by another electronic device on screen 810. In an example of FIG. 8, the electronic device may display an identifier such as an icon and a name of each of a plurality of applications stored in another electronic device in the list 840.

Referring to FIG. 8, in the screen 810, the electronic device, together with the list 840, may display a visual object 850 that obtains a user input for searching for at least one of a plurality of applications stored in another electronic device. For example, based on a keyword input within the visual object 850 based on the text box, the electronic device may temporarily stop displaying at least one of a plurality of applications in the list 840. The electronic device may request transmission of a screen and audio based on the application selected by the user input to another electronic device within the list 840, in response to receiving a user input for selecting an application (e.g., a user input for touching and/or clicking an icon included in list 840). In response to receiving the user input, the electronic device may obtain a remote application container and/or remote audio corresponding to the application. Another electronic device receiving the request may obtain a source application container and/or source audio related to the application while executing the application. In response to receiving a video signal and an audio signal corresponding to the request, the electronic device may appear on at least a portion of a display distinguished from the screen 810 by the video signal and display a screen of the application provided from the other electronic device. In response to receiving an audio signal corresponding to the request, the electronic device may appear by the audio signal through a speaker and output audio generated by the application executed by the other electronic device.

Referring to FIG. 8, in the screen 810, the electronic device may display visual objects 830 related to mirroring of screens and audio output through displays and speakers of other electronic devices. In response to receiving a user input for touching and/or clicking visual object 830, the electronic device may request a screen and audio output through a display and a speaker of another electronic device to another electronic device. In response to receiving a user input related to the visual object 830, the electronic device may obtain the screen mirroring sink manager 415 and/or the entire remote audio 710 of FIG. 7. Another electronic device that has received the request related to the visual object 830 may obtain the screen mirroring source manager 410 and/or the entire source audio 510 of FIG. 5. In response to receiving a video signal indicating a screen being output through a display of another electronic device, the electronic device may display a screen indicated by the video signal on at least a portion of the display distinguished from the screen 810. In response to receiving an audio signal indicating audio output through a speaker of another electronic device, the electronic device may output audio indicated by the audio signal through the speaker.

Hereinafter, referring to FIG. 9, in a state in which the electronic device of FIG. 8 receives a first user input related to the visual object 830 and a second user input related to a specific application included in the list 840, one or more screen streaming sessions and one or more audio streaming sessions established between the electronic device and the other electronic device will be described in greater detail.

Figure 9:
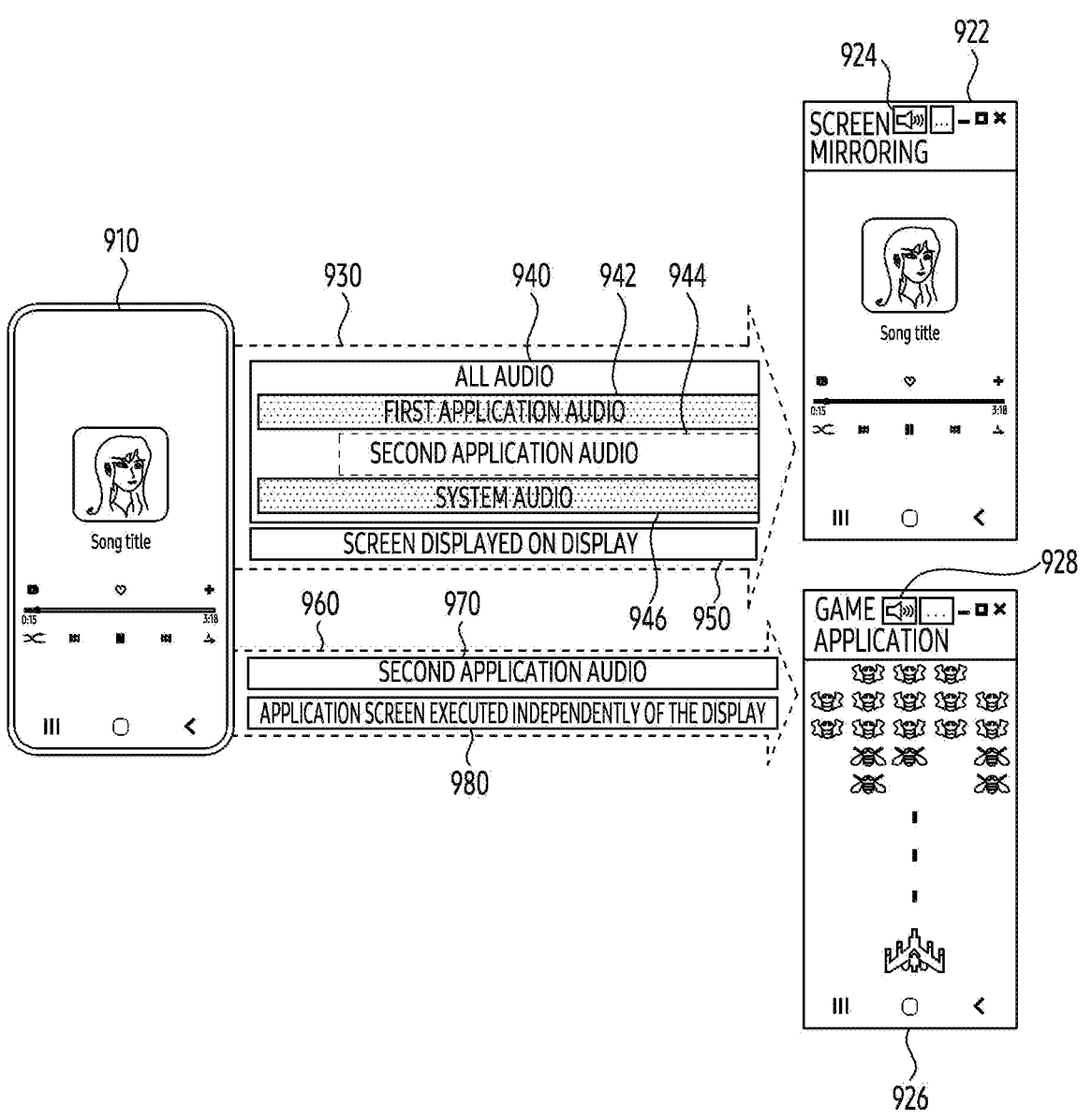
FIG. 9 is a diagram illustrating examples of one or more connections established between electronic devices according to various embodiments.

FIG. 9 is a diagram illustrating example connections established between electronic devices according to various embodiments. The one or more connections may be included in the connection 220 of FIGS. 2 to 4. The screen 910 of FIG. 9 shows an example of a UI displayed through the electronic device 101 of FIGS. 1 to 3 and/or the display 342 of the source electronic device of FIG. 4. The screen 910 of FIG. 9 shows an example of a UI displayed through the display (e.g., the display 342 of FIG. 3) of the electronic device 101 of FIGS. 1 to 3 and/or the source electronic device of FIG. 4. The screens 922 and 926 of FIG. 9 illustrate an example of a UI independently displayed on the display (e.g., display 344 of FIG. 3) of the electronic device 210 of FIGS. 1 to 3 and/or the remote electronic device of FIG. 4.

Referring to FIG. 9, the remote electronic device may display a visual object 924 corresponding to the screen 910 of the source electronic device in response to identifying a first user input (e.g., a user input related to the visual object 830 of FIG. 8) for requesting multimedia content received from the remote electronic device and output from the source electronic device. In response to identifying the first user input, a mirroring session 930 may be established between the source electronic device and the remote electronic device to stream screens and audio corresponding to the display and speakers of the source electronic device. The mirroring session 930 may, for example, cause data transmission between the screen mirroring source manager 410 of FIG. 4 and the screen mirroring sink manager 415.

Referring to FIG. 9, the mirroring session 930 may include a video streaming session 950 for streaming a screen displayed on the display of the source electronic device. The video streaming session 950 may be established based on the mapping of the screen mirroring source manager 410 and the screen mirroring sink manager 415 of FIG. 4. Referring to FIG. 9, the mirroring session 930 may include an audio streaming session 940 for streaming all audio (e.g., all applications running on the source electronic device and audio generated by an operating system). The audio streaming session 940 may be used for streaming between the entire source audio 510 of FIG. 5 and the entire remote audio 710 of FIG. 7. Through the audio streaming session 940, the source electronic device may stream system audio 946 generated by an operating system executed and audio 942 corresponding to the first application corresponding to the screen 910 to the source electronic device.

Referring to FIG. 9, the remote electronic device may display a screen 922 corresponding to the screen 910 of the source electronic device using the video streaming session 950 of the mirroring session 930. In the screen 922, the remote electronic device may further display one or more visual objects for changing the size and/or position of the screen 922 within the display of the remote electronic device. The remote electronic device may further display information related to the source electronic device corresponding to the screen 922 in the screen 922. In the state of displaying the screen 922, the remote electronic device may output audio (e.g., system audio 946 and audio 942 corresponding to the first application) provided from the source electronic device based on the audio streaming session 940 included in the mirroring session 930. In the screen 922, the remote electronic device according to an embodiment may display a visual object 924 for changing the volume of the audio output based on the audio streaming session 940 corresponding to the screen 922. The visual object 924 may be displayed based on, for example, the volume controller 760 of FIG. 7.

In an example of FIG. 9, in a state in which a screen 910 corresponding to the entire display area of the display of the source electronic device is provided to the remote electronic device, in response to receiving a second user input (e.g., a user input for selecting the second application within the list 840 of FIG. 8) for executing the second application, the remote electronic device may request execution of a second application indicated by the second user input from the remote electronic device to the source electronic device. In response to identifying the second user input, a mirroring session 960 distinguished from the mirroring session 930 may be established between the source electronic device and the remote electronic device. The mirroring session 960 may be established by, for example, a source application container and a remote application container related to the second application indicated by the second user input.

In response to identifying that the second application indicated by the second user input is distinguished from the first application provided through the screen 910, the source electronic device may execute the second application independently of the display and streaming of the screen 910 to obtain a screen corresponding to the second application. The screen corresponding to the second application may be obtained by the source electronic device in a state where the source electronic device maintains displaying the screen 910 on the display. Referring to FIG. 9, the mirroring session 960 may include a video streaming session 980 for streaming a screen corresponding to the second application. The video streaming session 980 may be established based on mapping of a source application container and a remote application container. Referring to FIG. 9, the mirroring session 960 may include an audio streaming session 970 for streaming audio generated based on the second application.

Referring to FIG. 9, the remote electronic device may display a screen 926 based on a second application executed in the source electronic device using a video streaming session 980. While the mirroring session 960 is established, based on the audio streaming session 970, the remote electronic device may be provided from the source electronic device, and output audio corresponding to the second application. The remote electronic device according to an embodiment may display a visual object 928 in the screen 926 for changing the volume of the audio output based on the audio streaming session 970 corresponding to the screen 926. The visual object 928 may be associated with, for example, a volume controller of remote audio corresponding to the second application. The visual object 928 may be displayed in connection with the screen 926, for example, and may be displayed by at least partially overlapping on a visual object such as a title bar displaying information related to the screen 926.

Independently of the signal from the above-described source electronic device to the remote electronic device, a signal from the remote electronic device to the source electronic device may be transmitted using mirroring sessions 930 and 960 between the source electronic device and the remote electronic device according to an embodiment. For example, a user input detected in each of the screens 922 and 926 of the remote electronic device may be transmitted from the remote electronic device to the source electronic device through mirroring sessions 930 and 960 corresponding to each of the screens 922 and 926. The source electronic device may change video signals and/or audio signals provided to the remote electronic device through mirroring sessions 930 and 960, based on the user input. The signal transmitted from the remote electronic device to the source electronic device and notifying the detection of the user input may include a display ID and/or a task ID corresponding to the screen on which the user input is detected among screens 922 and 926. The display ID and/or the task ID included in the signal may be used by a remote electronic device to identify a remote application container and/or a screen mirroring sink manager corresponding to the user input. Based on the identified remote application container and/or screen mirroring sink manager, the remote electronic device may transmit a signal notifying the detection of the user input to the source application controller and/or the screen mirroring source manager of the source electronic device.

As shown in FIG. 9, in a state in which all mirroring sessions 930 for streaming all audio of the source electronic device and 960 for individually streaming a specific application (e.g., a second application) are established, the source electronic device according to an embodiment may remove audio corresponding to the specific application within the audio streaming session 940 included in the mirroring session 930. For example, within the audio streaming session 940, the source electronic device may perform the above-described operation in FIG. 6 and mix audio 944 related to the second application corresponding to the mirroring session 960 based on a volume indicating mute. Referring to FIG. 9, other audio (e.g., system audio 946 and/or audio 942 of the first application) distinguished from the audio 944 related to the second application may be included in the audio streaming session 940, based on a volume distinguished from the volume indicating mute. Referring to FIG. 9, instead of removing the audio 944 related to the second application within the audio streaming session 940, the source electronic device may transmit audio generated based on the second application to the remote electronic device using the audio streaming session 970.

Hereinafter, referring to FIG. 10, an operation in which the remote electronic device according to an embodiment individually changes the volume of audio corresponding to each of the screens 922 and 926 based on the visual objects 924 and 928 corresponding to each of the screens 922 and 926 will be described in greater detail.

Figure 10:
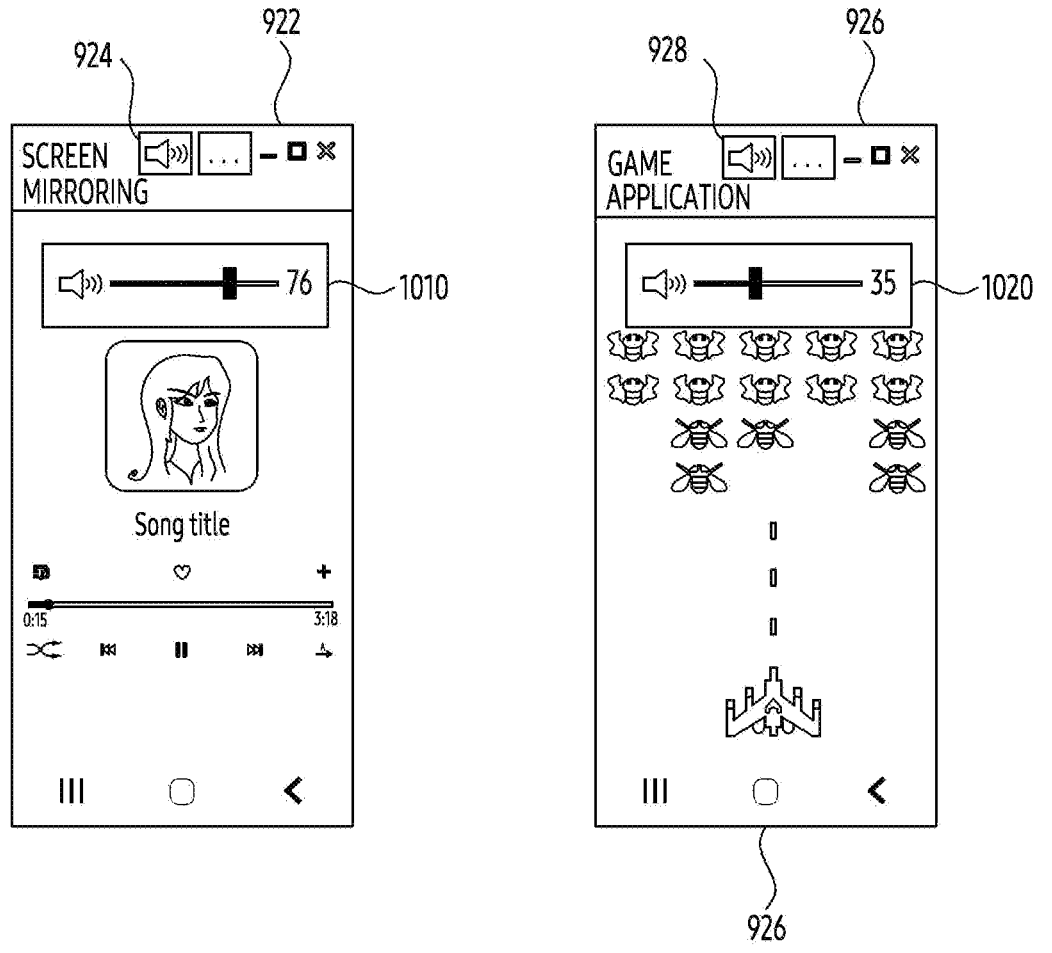
FIG. 10 is a diagram illustrating an example of a UI displayed by an electronic device to adjust the volume of audio signals corresponding to each of a plurality of screens provided from another electronic device according to various embodiments.

FIG. 10 is a diagram illustrating an example UI displayed by an electronic device to adjust the volume of audio signals corresponding to each of a plurality of screens 922 and 926 provided from another electronic device according to various embodiments. The electronic device of FIG. 10 may correspond to an example of the electronic device 210 of FIGS. 1 to 3 and/or the remote electronic device of FIG. 4. The other electronic device of FIG. 10 may correspond to an example of the electronic device 101 of FIGS. 1 to 3 and/or the source electronic device of FIG. 4. In the screens 922 and 926 of FIG. 10, for example, the electronic device 210 of FIG. 3 may be independently displayed on at least a portion of the display 344. The screens 922 and 926 of FIG. may correspond to the screens 922 and 926 of FIG. 9. Hereinafter, in a state in which all of the screens 922 and 926 are displayed based on the operations described above in FIG. 9, an operation performed by the electronic device of FIG. 10 corresponding to the remote electronic device will be described. Hereinafter, a description overlapping with FIG. 9 may not be repeated for convenience.

Referring to FIG. 10, UIs 1010 and 1020 displayed by the electronic device are illustrated in response to receiving a user input for touching and/or clicking visual objects 924 and 928 respectively within screens 922 and 926. UI 1010 may be displayed to overlap at least a portion of screen 922 in order to change the volume of audio corresponding to screen 922 (e.g., audio based on an audio signal mixed with all audio generated from another electronic device). UI 1020 may be displayed to change the volume of audio corresponding to screen 1020 (e.g., audio based on one application executed by the other electronic device independently of a display area of a display of another electronic device).

Referring to the UIs 1010 and 1020 of FIG. 10, each of the UIs 1010 and 1020 may include at least one of a text (e.g., any one of the natural numbers between 0 and 100) indicating a volume of corresponding audio, an icon indicating that each of the UIs 1010 and 1020 is a UI for adjusting a volume, visual objects (e.g., slide bars) for adjusting the volume based on a gesture such as dragging. Referring to FIG. 10, the user of the electronic device may independently change the volume of audio corresponding to each of the screens 922 and 926 using the UIs 1010 and 1020. For example, when the volume is changed using UI 1010, the changed volume may be displayed through screen 926 and may be applied to other audio, which is distinguished from audio provided by an application running on the source electronic device. For example, in response to identifying a user input for changing the volume within UI 1020, the electronic device may change the volume of audio related to the audio streaming session 970 corresponding to the screen 926 related to the UI 1020 among the audio streaming sessions 940 and 970. Changing the volume of audio related to audio streaming session 970 may be performed independently of the volume related to audio streaming session 940 and appearing by UI 1010.

As described above, when screens corresponding to each of the applications stored in another electronic device are individually displayed, the electronic device according to an embodiment may display UIs 1010 and 1020 for individually changing the volume of audio output from the electronic device corresponding to each of the screens.

Figure 11:
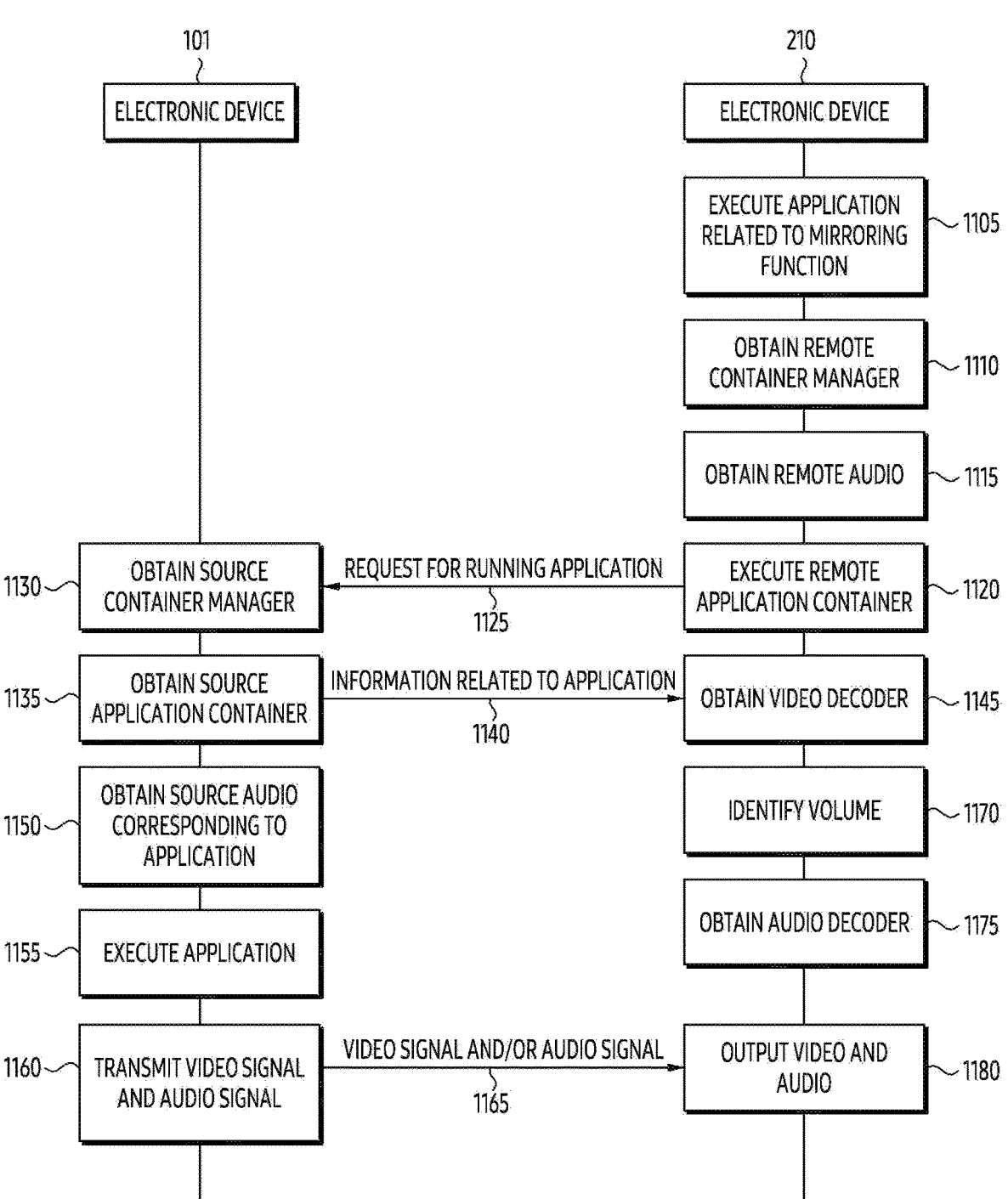
FIG. 11 is a signal flow diagram illustrating example operations performed by electronic devices according to various embodiments.

Hereinafter, operations performed by the electronic device and the other electronic device will be described in greater detail below with reference to FIGS. 11, 12, 13, 14, 15 and 16. FIG. 11 is a signal flow diagram illustrating an example operation performed by the electronic devices 101 and 210 according to various embodiments. The electronic device 101 of FIG. 11 may correspond to an example of the electronic device 101 of FIGS. 1 to 3, and/or the source electronic device of FIGS. 4 and 9. The electronic device 210 of FIG. 11 may correspond to an example of the electronic device 210 of FIGS. 1 to 3, and/or the remote electronic device of FIGS. 4 and 9. The operation of FIG. 11 may be performed, for example, by the processor 312 of the electronic device 101 of FIG. 3 and/or the processor 314 of the electronic device 210.

Referring to FIG. 11, in operation 1105, the electronic device 210 according to an embodiment may execute an application related to a mirroring function. For example, in response to receiving a user input for selecting the application, the electronic device 210 may execute the application. The application executed by the electronic device 210 based on operation 1105 may be related to, for example, the program 374 of FIG. 4.

Referring to FIG. 11, in operation 1110, the electronic device 210 according to an embodiment may obtain a remote container manager (e.g., the remote container manager 425 of FIG. 4) using an application executed based on operation 1105. For example, the electronic device 210 may initialize the remote container manager. Along with the remote container manager, the electronic device 210 may initialize one or more instances (e.g., screen mirroring sink manager 415 and remote audio manager 435) included in the program 374 of FIG. 4. Initialization of an instance may include, for example, fetching one or more parameters related to the instance in memory, distinct from execution of the instance. In operation 1110, the electronic device 210 according to an embodiment may initialize one or more remote application containers (e.g., remote application containers 427-1, 427-2, . . . , 427-N of FIG. 4). The one or more remote application containers are identified from the electronic device 101 and correspond to each of the one or more applications stored in the electronic device 101 by an application executed based on operation 1105. For example, as the one or more remote application containers are initialized, the electronic device 210 may store an identifier (e.g., package name) of a corresponding application in the remote application container.

Referring to FIG. 11, in operation 1115, the electronic device 210 according to an embodiment may obtain remote audio in response to requesting remote audio based on a remote application container. The remote audio may include, for example, the entire remote audio 710 of FIG. 7 and/or remote audio 437-1, . . . , 437-M. For example, the electronic device 210 may obtain remote audio corresponding to the UID of the application based on an application related to the remote application container corresponding to the request. obtaining remote audio by electronic device 210 may include an operation of connecting a corresponding remote application container with the obtained remote audio. An operation in which the electronic device 210 obtains remote audio based on operation 1115 will be described in greater detail below with reference to FIG. 12.

Referring to FIG. 11, in operation 1120, the electronic device 210 according to an embodiment may execute a remote application container. Operation 1120 may be performed, for example, in response to receiving a user input based on visual object 830 and/or list 840 in electronic device 210. In operation 1120, the electronic device 210 may transmit a signal 1125 for requesting execution of an application corresponding to the user input to the electronic device 101. Signal 1125 may include information (e.g., package name) for identifying an application, indicated by the user input performed by electronic device 210 and stored in electronic device 101.

Referring to operations 1105, 1110, 1115, and 1120, the electronic device 210 according to an embodiment may perform operations 1105, 1110, 1115, and 1120 before a mirroring session is established between the electronic device 210 and the electronic device 101. For example, operations 1105, 1110, 1115, and 1120 may be related to an operation of preparing the mirroring session.

In response to receiving the signal 1125 from the electronic device 210, in operation 1130, the electronic device 101 according to an embodiment may obtain a source container manager (e.g., the source container manager 420 of FIGS. 4 to 5). In response to receiving the signal 1125, the electronic device 101 may initialize the source container manager. In operation 1135, the electronic device 101 may obtain a source application container based on an application indicated by the signal 1125. In response to obtaining the source application container, the electronic device 101 may transmit a signal 1140 including the obtained source application container and/or information related to the application to the electronic device 210. For example, after executing the application indicated by the signal 1125, the signal 1140 may include information related to the UID allocated to the executed application by the system service of the electronic device 101.

Referring to FIG. 11, in operation 1150, the electronic device 101 according to an embodiment may obtain source audio corresponding to an application indicated by the signal 1125. The source audio may be distinguished from other source audio based on a UID allocated to the application. In response to obtaining source audio, the electronic device 101 may store information (e.g., a pointer indicating a location where one or more parameters related to the source audio are stored in the memory.) indicating the obtained source audio in a source audio handle in a source application container corresponding to the source audio.

Referring to FIG. 11, in operation 1155, the electronic device 101 according to an embodiment may execute an application indicated by the signal 1125. As the application is executed, streaming of screens and audio obtained by the electronic device 101 based on the application may be started. For example, the electronic device may perform encoding on the screen using a source application container corresponding to the application. For example, the electronic device may perform encoding on the audio using source audio corresponding to the application. For example, the electronic device may individually obtain audio corresponding to the application using the UID of the application identified through an audio service (e.g., the audio service 450 of FIG. 4).

Referring to FIG. 11, in operation 1160, the electronic device 101 according to an embodiment may transmit a video signal and an audio signal obtained based on an application executed by operation 1155 to the electronic device 210. For example, the signal 1165 may correspond to at least one of the video signal and the audio signal. Referring to FIG. 11, in response to the electronic device 101 receiving a request based on the signal 1125, operations 1130, 1135, 1150, 1155, and 1160 may be performed to execute an application displayed by the signal 1125 and transmit a video signal and an audio signal obtained based on the executed application to the electronic device 210.

Referring to FIG. 11, in operation 1145 in response to receiving the signal 1140, the electronic device 210 according to an embodiment may obtain a video decoder corresponding to the remote application container. For example, the electronic device 210 may obtain a video decoder, an output surface, and a surface view included in the remote application container. In operation 1145, the electronic device 210 may execute a video decoder.

Referring to FIG. 11, in operation 1170, the electronic device 210 according to an embodiment may identify a volume related to the application using remote audio related to an application corresponding to the signal 1125. The identified volume may be used to adjust the volume of the media element of the remote audio to the identified volume. Referring to FIG. 11, in operation 1175, the electronic device 210 according to an embodiment may obtain an audio decoder corresponding to the application based at least on information included in the signal 1140. The electronic device 210 may execute the obtained audio decoder.

Referring to FIG. 11, in operation 1180, in response to receiving a signal 1165 corresponding to at least one of a video signal or an audio signal provided from the electronic device 101, the electronic device 210 according to an embodiment may output a screen corresponding to the video signal and audio corresponding to the audio signal. The signal 1165 may be transmitted from the electronic device

101 to the electronic device 210 while a mirroring session established between the electronic devices 101 and 210 is established.

Figure 12:
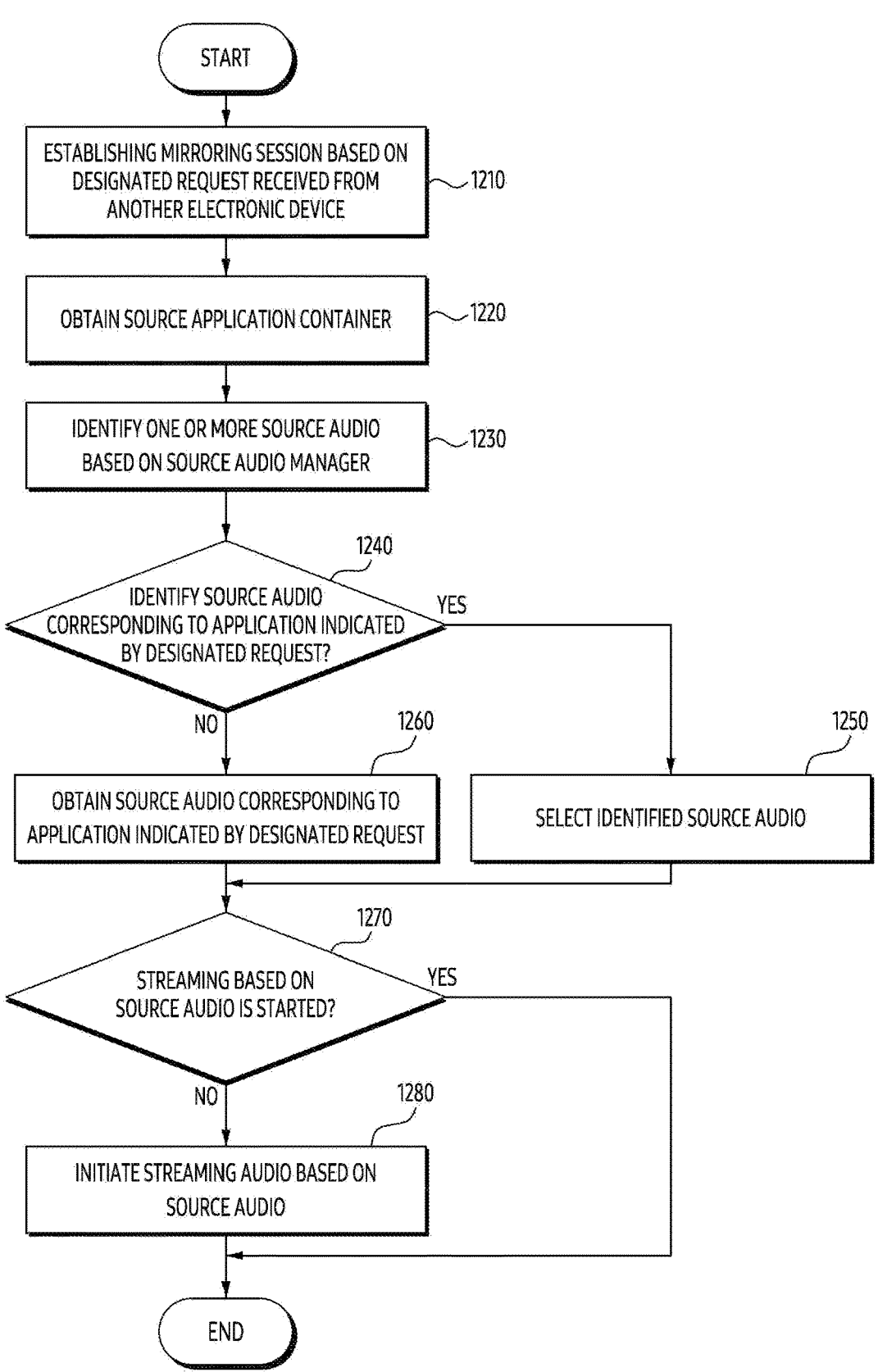
FIG. 12 is a flowchart illustrating an example operation performed by electronic devices to stream audio according to various embodiments.

FIG. 12 is a flowchart illustrating an example operation performed by electronic devices to stream audio according to various embodiments. The electronic device of FIG. 12 may correspond to an example of the electronic device 101 of FIGS. 1 to 3, and/or the source electronic device of FIGS. 4 and 9. The other electronic device of FIG. 12 may correspond to an example of the electronic device 210 of FIGS. 1 to 3, and/or the remote electronic device of FIGS. 4 and 9. The operation of FIG. 12 may be performed, for example, by the processor 312 of the electronic device 101 of FIG. 3.

Referring to FIG. 12, in operation 1210, an electronic device according to an embodiment may establish a mirroring session based on a designated request received from another electronic device. The designated request may be related to, for example, a user input identified from a user while another electronic device displays the screen 810 of FIG. 8. For example, the designated request may correspond to a request to transmit audio provided from the application by executing an application stored in the electronic device and/or audio being played through a speaker of the electronic device. The mirroring session may be established between the electronic device and another electronic device to stream the screen and/or audio of the electronic device. Establishment of a mirroring session may be established by source controller manager 420 and remote container manager 425 which are instances generated by each of the programs 372 and 374, with the electronic device executing program 372 and the another electronic device executing program 374.

Referring to FIG. 12, in operation 1220, the electronic device according to an embodiment may obtain a source application container. For example, the electronic device may generate a source application container corresponding to an application indicated by a designated request in operation 1210 using the source container manager. The source application container obtained by the electronic device based on operation 1220 may correspond to, for example, any one of the source application containers 422-1, 422-2, . . . , 422-N of FIG. 4. The source application container obtained as the electronic device performs operation 1220 may include an identifier uniquely assigned to the application and/or a screen generated by the application. The identifier may include, for example, at least one of a package name of the application, a UID uniquely assigned to the application, a display ID or a task ID uniquely assigned to the screen.

Referring to FIG. 12, in operation 1230, the electronic device according to an embodiment may identify one or more source audio based on the source audio manager. For example, the electronic device may identify source audio related to an application indicated by a designated request using the source audio manager 430 of FIG. 4. The source audio identified by the electronic device based on operation 1230 may include, for example, source audio 432-1, . . . , 432-M of FIG. 4. For example, the electronic device may identify one or more source audios generated by the source audio manager before receiving the specified request in operation 1210.

Referring to FIG. 12, in operation 1240, the electronic device according to an embodiment may determine whether a source audio corresponding to an application indicated by a designated request is identified among one or more source audios identified based on operation 1230. For example, among one or more source audios identified in operation 1230, the electronic device may search for source audio distinguished by an identifier (e.g., UID and/or package name) of an application indicated by a specified request in operation 1210. The search for the source audio may be performed based on a source audio manager executed in an electronic device.

In operation 1250 when the source audio corresponding to the application indicated by the designated request is identified, the electronic device according to an embodiment may select the identified source audio. For example, by identifying source audio having an identifier of an application indicated by a specified request in operation 1210, the electronic device may determine that an audio streaming session based on the application exists before establishing a mirroring session in operation 1210. The audio streaming session may be identified by the source audio identified by the electronic device. Based on the correspondence between the source audio and the remote audio described above in FIG. 4, the electronic device may identify remote audio generated by another electronic device based on the identified source audio.

When the source audio corresponding to the application indicated by the designated request is not identified (1240-No), in operation 1260, the electronic device according to an embodiment may obtain the source audio corresponding to the application indicated by the designated request. For example, using the source audio manager, the electronic device may generate source audio having an identifier (e.g., a UID and/or a package name of the application) related to an application indicated by a specified request in operation 1210.

Referring to operations 1240, 1250, and 1260, in response to receiving a designated request from another electronic device to transmit audio of the application, the electronic device according to an embodiment may determine whether there is an audio streaming session for transmitting audio of the application to the other electronic device before receiving the specified request. When the audio streaming session exists (1240—Yes), instead of adding an audio streaming session, the electronic device may reuse the audio streaming session to stream audio of the application. When the audio streaming session does not exist (1240—No), the electronic device may generate source audio to add an audio streaming session.

Referring to FIG. 12, in operation 1270, the electronic device according to an embodiment may determine whether streaming based on source audio is started. The streaming may be performed by an audio signal transmitted from the electronic device toward another electronic device and generated based on an application indicated by a designated request in operation 1210. The audio signal may be transmitted from the electronic device toward another electronic device, for example, based on an audio streaming session indicated by source audio. For example, when the source audio is selected based on operation 1250, streaming based on the source audio may have started before receiving the specified request of operation 1210.

When streaming based on source audio is not started (1270—No), in operation 1280, the electronic device according to an embodiment may initiate streaming audio based on source audio. For example, the electronic device may request the other electronic device to establish an audio streaming session (e.g., audio streaming sessions 940 and 970 of FIG. 9) based on the source audio. In response to the request, after the audio streaming session is established, the electronic device may transmit audio generated by an application indicated by a designated request in operation 1210 to another electronic device.

As described above, in a state of generating a first mirroring session corresponding to a specific application, the electronic device according to an embodiment may identify an audio streaming session generated by the second mirroring session generated before the first mirroring session by a specific application. When identifying an audio streaming session generated by the second mirroring session, the electronic device may determine the identified audio streaming session as a session for streaming audio related to the first mirroring session. In this case, streaming of audio based on the first mirroring session may be performed between the electronic device and the other electronic device without increasing the audio streaming session.

Hereinafter, referring to FIG. 13, an operation performed to end streaming of audio between an electronic device and other electronic devices according to an embodiment will be described in greater detail.

Figure 13:
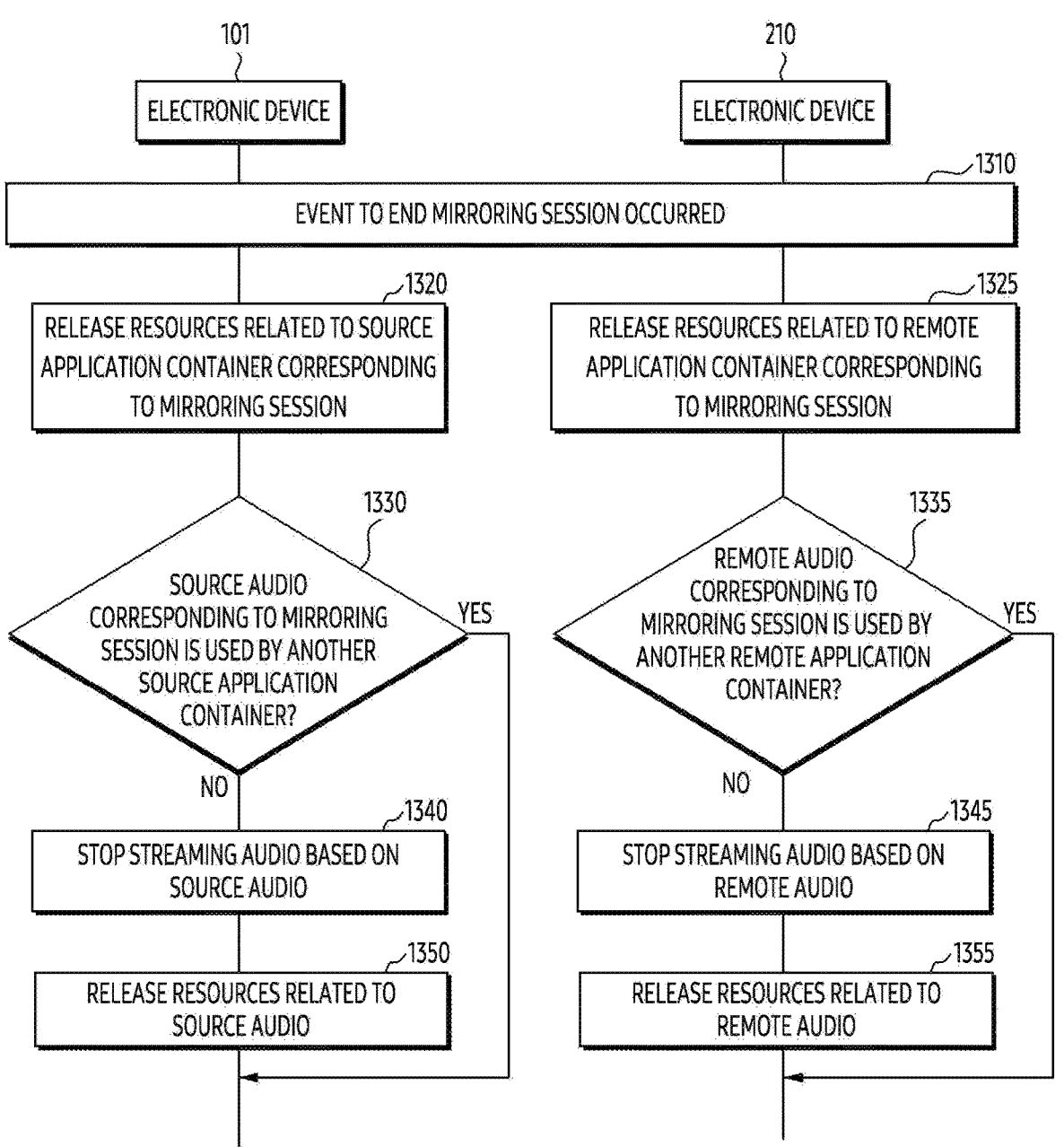
FIG. 13 is a flowchart illustrating an example operation performed by electronic devices to end streaming audio according to various embodiments.

FIG. 13 is a flowchart illustrating an example operation performed by electronic devices to end streaming audio according to various embodiments. The electronic device 101 of FIG. 13 may correspond to an example of the electronic device 101 of FIGS. 1 to 3, and/or the source electronic device of FIGS. 4 and 9. The electronic device 210 of FIG. 13 may correspond to an example of the electronic device 210 of FIGS. 1 to 3, and/or the remote electronic device of FIGS. 4 and 9. The operation of FIG. 13 may be performed, for example, by the processor 312 of the electronic device 101 of FIG. 3 and/or the processor 314 of the electronic device 210. For example, the operation of FIG. 13 may be performed in a state in which the electronic devices 101 and 210 transmit one or more audio signals by performing at least one of the operations of FIGS. 11 to 12.

Referring to FIG. 13, in operation 1310, the electronic devices 101 and 210 according to an embodiment may detect occurrence of an event terminating a mirroring session. The mirroring session may correspond to, for example, any one of the mirroring sessions 930 and 960 of FIG. 9. The event for terminating the mirroring session may include, for example, a user input for terminating any one of the screens 922 and 926 of FIGS. 9 to 10.

Referring to FIG. 13, in response to detecting occurrence of the event, in operation 1320, the electronic device 101 according to an embodiment may release a resource related to a source application container corresponding to the mirroring session related to the event. For example, the electronic device 101 may terminate the mirroring session by terminating the source application container corresponding to the event. Release of resources related to the source application container may include an operation of removing information related to the source application container or overwriting other information within the memory of the electronic device 101. In operation 1325, similar to operation 1320, electronic device 210 according to an embodiment may release resources related to the remote application container corresponding to the mirroring session related to the event. As the electronic devices 101 and 210 perform operations 1320 and 1325, the mirroring session established between the electronic devices 101 and 210 may be terminated.

In an example configuration, as resources related to the source application container are released based on the connection between the source audio and the source application container, the electronic device 101 may determine whether to release a resource related to the source audio. Similarly, the electronic device 210 may determine whether to release a resource related to the remote audio based on the connection between the remote audio and the remote application container.

Referring to FIG. 13, in operation 1330, the electronic device 101 according to an embodiment may determine whether source audio corresponding to the mirroring session of operation 1310 is used by another source application container. In an example of FIG. 5, when the mirroring session terminated by operation 1310 corresponds to the source application container 422-1, the source audio 432-1 corresponding to the source application container 422-1 may be used by a source application container 422-2 distinguished from the source application container 422-1. In an example of FIG. 5, when the mirroring session of operation 1310 corresponds to the source application container 422-N, the source audio 432-M may not be used by other source application containers distinct from the source application container 422-N. The electronic device, as information stored in the source audio, may remove an identifier indicating the source application container released by operation 1320 from the list of source application containers connected to the source audio. By removing the identifier, when no identifier exists in the list, the electronic device may determine that the source audio is not used by another source application container.

When source audio corresponding to the mirroring session of operation 1310 is used by another source application container (1330—YES), the electronic device 101 may at least temporarily stop terminating the source audio. When the source audio corresponding to the mirroring session of operation 1310 is not used by another source application container (1330—NO), in operation 1340, the electronic device 101 may stop streaming audio based on the source audio. After the audio streaming is stopped, in operation 1350, the electronic device 101 may release a resource related to the source audio.

Similarly, in operation 1335, the electronic device 210 may determine whether remote audio corresponding to the mirroring session of operation 1310 is used by another remote application container. When the remote audio is used by another remote application container (1335—YES), the electronic device 210 may maintain streaming audio based on the remote audio. In an example of FIG. 7, even when a resource related to the remote application container 427-1 is released, as the remote application container 427-2 distinguished from the remote application container 427-1 is connected to the remote audio 437-1, execution of the remote audio 437-1 corresponding to the remote application container 427-1 may be maintained. When the remote audio is not used by another remote application container (1335—NO), in operation 1345, the electronic device 210 may stop streaming audio based on the remote audio. After the audio streaming is stopped, in operation 1355, the electronic device 210 may release a resource related to the remote audio. In an example of FIG. 7, as resources related to the remote application container 427-N are released, the electronic device 210 may remove remote audio 437-M not connected to any remote application container.

As described above, the electronic devices 101 and 210 according to an embodiment may determine whether to maintain an audio streaming session corresponding to the mirroring session as the mirroring session corresponding to the shared one screen ends based on the mirroring function. The audio streaming session may be established by source audio of electronic device 101 and remote audio of electronic device 210, which are distinguished for each specific application corresponding to the one screen. For example, when the electronic devices 101 and 210 share a plurality of screens generated by a specific application, the electronic devices 101 and 210 may maintain an audio streaming session corresponding to the mirroring session independently of termination of one of the screens. The audio streaming session may be interrupted in response to termination of all mirroring sessions corresponding to a plurality of screens generated by the specific application.

Figure 14:
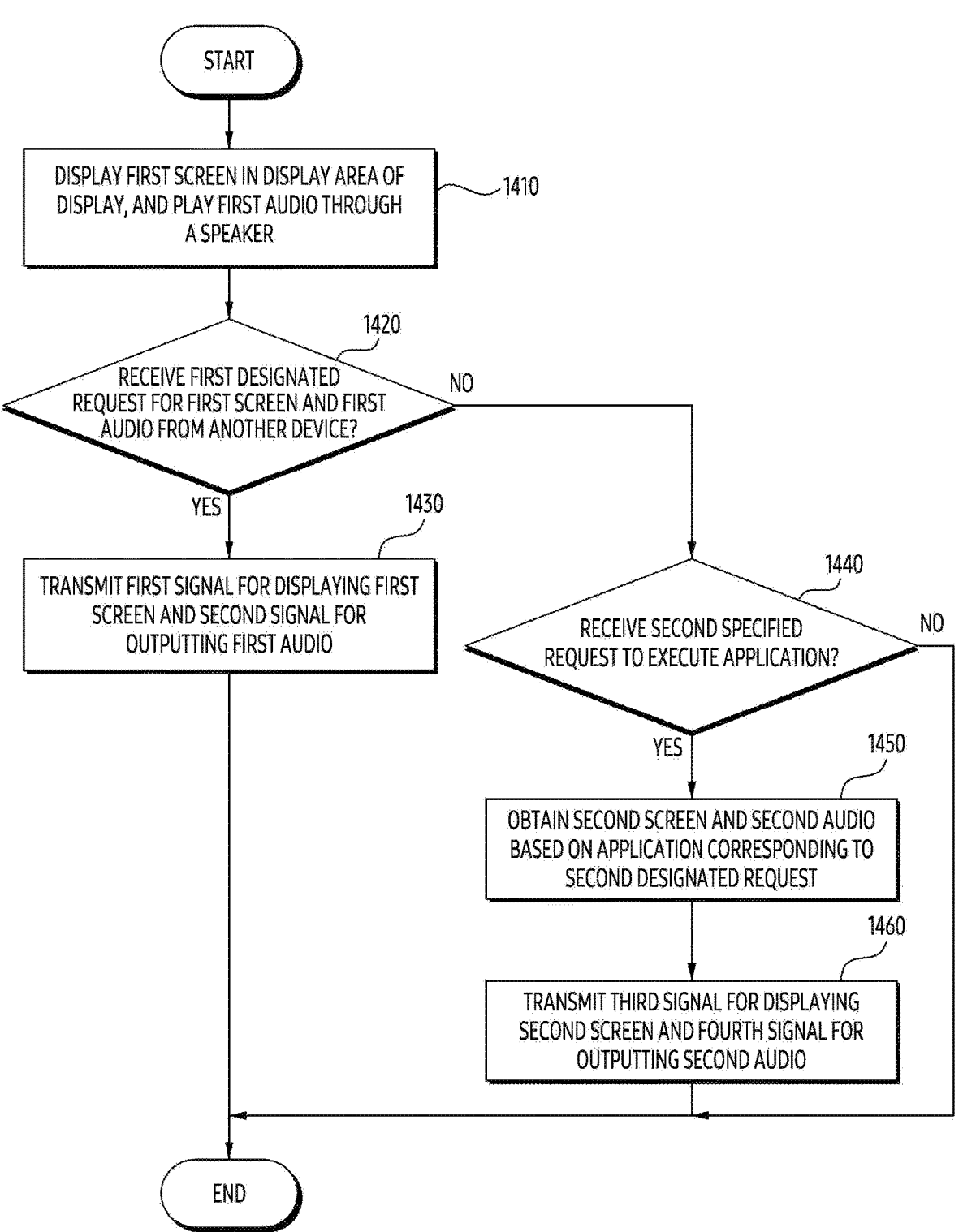
FIG. 14 is a flowchart illustrating an example operation in which an electronic device obtains a signal for outputting one or more audio to another electronic device according to various embodiments.

FIG. 14 is a flowchart illustrating an example operation in which an electronic device obtains a signal for outputting one or more audio to another electronic device according to various embodiments. The electronic device of FIG. 14 may correspond to an example of the electronic device 101 of FIGS. 1 to 3, and/or the source electronic device of FIGS. 4 and 9. The other electronic device of FIG. 14 may correspond to an example of the electronic device 210 of FIGS. 1 to 3, and/or the remote electronic device of FIGS. 4 and 9. The operation of FIG. 14 may be performed, for example, by the processor 312 of the electronic device 101 of FIG. 3.

Referring to FIG. 14, in operation 1410, the electronic device according to an embodiment may display a first screen in a display area of a display and may reproduce the first audio through a speaker. The first screen may correspond to the entire display area of the display of the electronic device. The first audio may correspond to a combination of all audio executed in an electronic device.

Referring to FIG. 14, in operation 1420, the electronic device according to an embodiment may determine whether a first designated request for the first screen and the first audio has been received from another electronic device. The first designated request may be transmitted, for example, by another electronic device that has received a user input related to the visual object 830 of FIG. 8 to the electronic device.

When the first designated request of operation 1420 is received (1420—Yes), in operation 1430, the electronic device according to an embodiment may transmit a first signal for displaying the first screen and a second signal for outputting the first audio. The first signal and the second signal may be transmitted from the electronic device to another electronic device, for example, based on each of the screen streaming session 950 and the audio streaming session 940 included in the mirroring session 930 of FIG. 9. As the first signal and the second signal are transmitted, the other electronic device may output the first screen and the second screen.

When the first designated request of operation 1420 is not received (1420—No), in operation 1440, the electronic device according to an embodiment may determine whether the second designated request to execute the application is received. For example, the second designated request may be transmitted to the electronic device by another electronic device receiving a user input for selecting the application within the list 840 of FIG. 8.

When the second designated request of operation 1440 is received (1440—Yes), in operation 1450, the electronic device according to an embodiment may obtain the second screen and the second audio based on an application corresponding to the second designated request. The electronic device may obtain the second screen of operation 1450 in a state of maintaining display of the first screen of operation 1410 in the display area of the display.

Referring to FIG. 14, in operation 1460, an electronic device according to an embodiment may transmit a third signal for displaying a second screen and a fourth signal for outputting a second audio to another electronic device. In an embodiment, transmission of the third signal and the fourth signal based on operation 1460 may be performed simultaneously with transmission of the first signal and the second signal based on operation 1430 by the electronic device that has received all of the first designated request and the second designated request. In this case, the second signal may include data for providing the second audio related to the second screen based on mute, and data for reproducing the first audio based on a volume distinguished from mute. When the first to fourth signals of operations 1430 and 1460 are simultaneously transmitted from the electronic device to another electronic device, the electronic device may allocate a first identifier to the first signal and the second signal, and may allocate a second identifier distinguished from the first identifier to the third signal and the fourth signal. The second identifier may be related to, for example, the application of operation 1440. The first identifier may be related to, for example, a display area of the display in operation 1410. As the second signal corresponding to the first audio and the fourth signal corresponding to the second audio are distinguished by different identifiers, the electronic device may independently control the volume of each of the first audio and the second audio based on the second signal and the fourth signal.

FIG. 15 is a flowchart illustrating an example operation of mixing audio provided by an electronic device from a plurality of applications running in the electronic device according to various embodiments. The electronic device of FIG. 15 may correspond to an example of the electronic device 101 of FIGS. 1 to 3, and/or the source electronic device of FIGS. 4 and 9. The other electronic device of FIG. 15 may correspond to an example of the electronic device 210 of FIGS. 1 to 3, and/or the remote electronic device of FIGS. 4 and 9. The operation of FIG. 15 may be performed, for example, by the processor 312 of the electronic device 101 of FIG. 3. Hereinafter, it is assumed that the electronic device according to an embodiment has received a request (e.g., the first designated request of FIG. 14) to share all audio generated by the electronic device from another electronic device. The operation of FIG. 15 may be related to the operation of the electronic device described above in FIG. 6.

Referring to FIG. 15, in operation 1510, an electronic device according to an embodiment may obtain audio from one or more applications and system services executed in the electronic device. Referring to FIG. 6, the electronic device may obtain audio 612-1, 612-2, . . . , 612-N and system audio 610 corresponding to each of a plurality of applications running in the electronic device.

Referring to FIG. 15, in operation 1520, the electronic device according to an embodiment may obtain audio mixing information for mixing the obtained audio. The audio mixing information may be obtained, for example, by an electronic device that has executed the audio service 450 and/or the audio policy service 470 of FIGS. 4 and 6. The audio mixing information may include audio of one or more applications obtained in operation 1510 and volumes corresponding to audio of a system service.

Referring to FIG. 15, in operation 1530, an electronic device according to an embodiment may identify an application provided to another electronic device and executed in a display area different from a display area of a display of the electronic device. For example, based on the second designated request of FIG. 14, the electronic device may execute the application using a display area different from the display area of the display.

In the case where an application executed in a display area different from the display area of the electronic device is identified (1530—Yes), operation 1550, the electronic device according to an embodiment may change audio mixing information obtained based on operation 1520 based on audio corresponding to the identified application. For example, within the audio mixing information, the electronic device may change the volume corresponding to the audio of the identified application to a designated volume corresponding to mute.

Referring to FIG. 15, in operation 1560, the electronic device according to an embodiment may obtain a second signal for outputting audio corresponding to the identified application independently of the changed audio mixing information based on operation 1550. The second signal may include, for example, a fourth signal corresponding to the second audio of FIG. 14. The second signal may include, for example, data for outputting the audio based on a specified volume (e.g., maximum volume) distinguished from mute.

Referring to FIG. 15, in operation 1540, the electronic device according to an embodiment may obtain a first signal for being transmitted to another electronic device by mixing the audio obtained in operation 1510 based on the audio mixing information. The first signal may include, for example, a second signal corresponding to the first audio of FIG. 14. Referring to operations 1530, 1550, and 1560, the audio mixing information may be changed according to whether the application of operation 1530 has been identified. As the audio mixing information is changed, the electronic device may generate the first signal differently based on whether the application of operation 1530 is identified.

For example, when an application running in a display area different from the display area of the display is not identified (1530—No), the electronic device may mix the first signal based on audio mixing information independent of the application. In this case, the first signal obtained based on operation 1540 may represent audio combined along a volume in which the audio obtained in operation 1510 matches. For another example, when an application executed in a display area different from the display area of the display is identified (1530—YES), the electronic device may obtain a first signal based on the changed audio mixing information based on the application. In this case, the first signal obtained based on the operation 1540 may represent audio in which other audios except for the audio corresponding to the application of the operation 1530 are combined according to the matched volume by the operation 1550.

Figure 16:
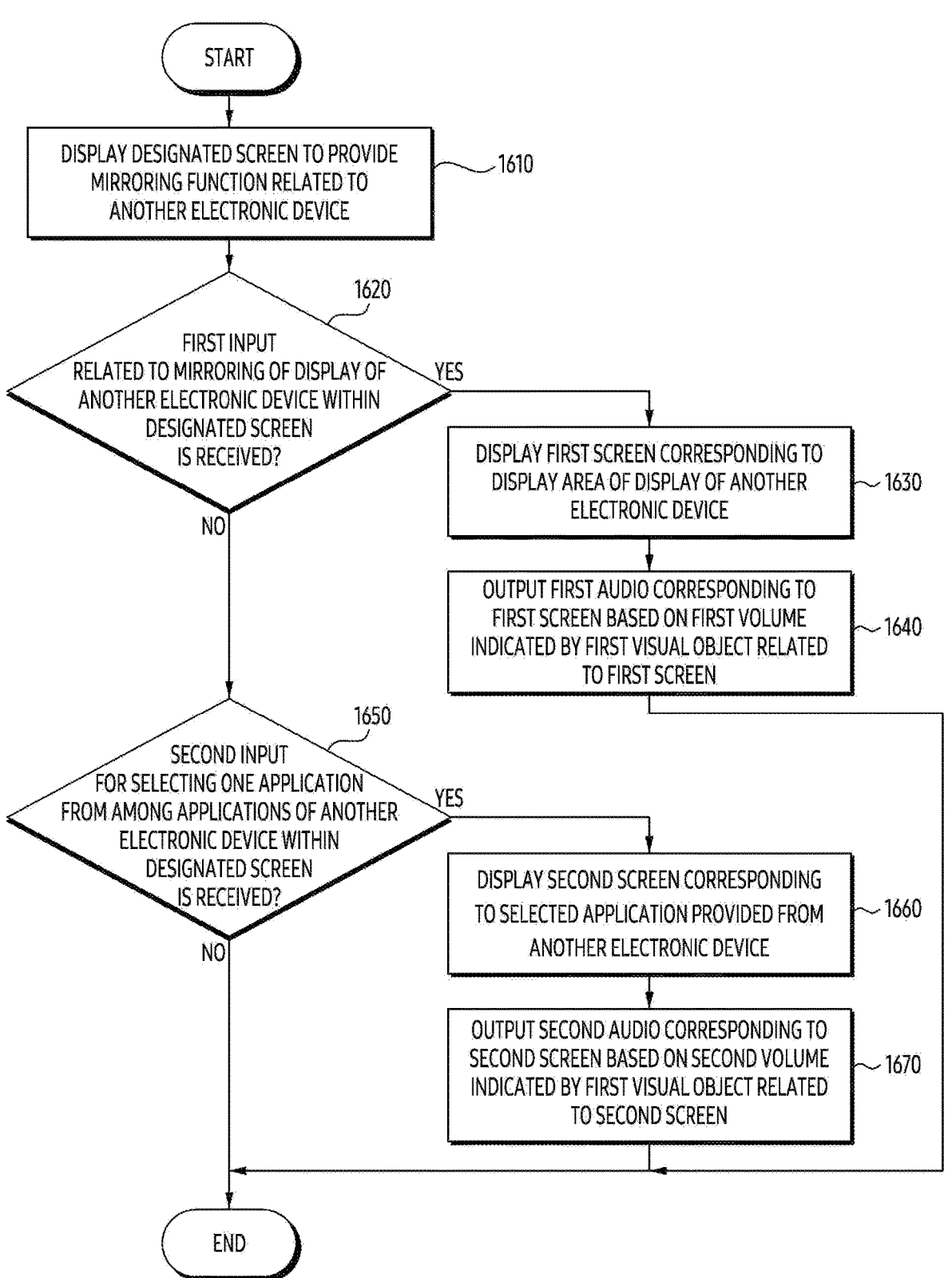
FIG. 16 is a flowchart illustrating an example operation in which an electronic device individually controls volumes of audio corresponding to each of a plurality of screens provided from another electronic device, according to various embodiments.

FIG. 16 is a flowchart illustrating an example operation in which an electronic device individually controls volumes of audio corresponding to each of a plurality of screens provided from another electronic device according to various embodiments. The electronic device of FIG. 16 may correspond to an example of the electronic device 210 of FIGS. 1 to 3, and/or the remote electronic device of FIGS. 4 and 9. The other electronic device of FIG. 16 may correspond to an example of the electronic device 101 of FIGS. 1 to 3, and/or the source electronic device of FIGS. 4 and 9. The operation of FIG. 16 may be performed, for example, by the processor 314 of the electronic device 210 of FIG. 3.

Referring to FIG. 16, in operation 1610, the electronic device according to an embodiment may display a designated screen for providing a mirroring function related to another electronic device. The designated screen may include, for example, the screen 810 of FIG. 8. For example, the electronic device may display the designated screen by executing the program 874 of FIGS. 4 and/or 7.

Referring to FIG. 16, in operation 1620, the electronic device according to an embodiment may determine whether a first input related to mirroring of a display of another electronic device is received within a designated screen. The first input may include, for example, a user input for selecting the visual object 830 of FIG. 8.

When the first input of operation 1620 is received (1620—YES), in operation 1630, the electronic device according to an embodiment may display a first screen corresponding to a display area of a display of another electronic device. The first screen may include the screen 922 of FIGS. 9 and/or 10. The electronic device may display the first screen by executing, for example, the screen mirroring sink manager 415 of FIGS. 4 and/or 7. For example, the first screen may be provided from another electronic device based on execution of the screen mirroring source manager 410 of FIGS. 4 and/or 7.

When the first input of operation 1620 is received (1620—YES), in operation 1640, the electronic device according to an embodiment may output the first audio corresponding to the first screen based on the first volume indicated by the first visual object related to the first screen. The first audio may be obtained by, for example, another electronic device based on the audio recorder 560 of FIG. 6, and may correspond to a combination of all audio generated from another electronic device. The first visual object may include the visual object 924 of FIGS. 9 to 10 and/or the UI 1010 of FIG. 10. For example, in response to identifying a user input for adjusting the first volume based on the first visual object, the electronic device may change the volume of the first audio output based on operation 1640 to the adjusted first volume.

Referring to FIG. 16, in operation 1650, the electronic device according to an embodiment may determine whether a second input for selecting one application from among applications of another electronic device is received within a designated screen. The second input may include, for example, a user input for selecting one application from among applications included in the list 840 of FIG. 8. Embodiments are not limited to the order of operations 1620 and 1650 illustrated in FIG. 16, and the electronic device may independently perform receiving the first input and the second input based on operations 1620 and 1650.

When the second input of operation 1650 is received (1650—YES), in operation 1660, the electronic device according to an embodiment may be provided from another electronic device and may display a second screen corresponding to an application selected by the second input. The second screen may include the screen 926 of FIGS. 9 and/or 10. The electronic device may display the second screen by executing, for example, the remote application container of FIGS. 4 and/or 7. For example, the second screen may be provided from another electronic device based on execution of the source application container.

When the second input of operation 1650 is received (1650—Yes), in operation 1670, the electronic device according to an embodiment may output the second audio corresponding to the second screen based on the second volume indicated by the second visual object related to the second screen. The second audio may be obtained by, for example, another electronic device based on one of the audio recorders 622-1 and 622-2 of FIG. 6, and may be generated by another electronic device as the application selected by the second input of operation 1650 is executed. The second visual object may include the visual object 928 of FIGS. 9 to 10 and/or the UI 1020 of FIG. 10. For example, in response to identifying a user input for adjusting the second volume based on the second visual object, the electronic device may change the volume of the second audio output based on operation 1670 to the adjusted second volume.

In an embodiment, as the operations of FIG. 16 are repeatedly performed, the electronic device may output the first screen and the first audio based on the operations 1630 and 1640 simultaneously with the second screen and the second audio based on the operations 1660 and 1670. In this case, the electronic device may individually adjust the first volume and the second volume corresponding to the first audio and the second audio based on operations 1640 and 1670.

As described above, according to an example embodiment, in a state of transmitting the first screen displayed on the display of the electronic device to another electronic device, the electronic device may transmit a first audio signal indicating a combination of all audio generated in the electronic device to another electronic device. In response to receiving a request to execute a specific application based on a second screen independent of the first screen in a state of transmitting a first audio signal to another electronic device, the electronic device may be distinguished from the first audio signal while transmitting a second screen for a specific application to another electronic device, and transmit a second audio signal generated in the specific application. In a state of independently transmitting the first audio signal and the second audio signal, the electronic device may remove audio corresponding to a specific application from a first audio signal indicating a combination of all audio.

As described above, according to an example embodiment, an electronic device may comprise: communication circuitry, a display, a speaker; a memory storing a plurality of instructions and at least one processor operably coupled to the communication circuitry, the display, the speaker and the memory; and wherein at least one processor, comprising processing circuitry, may individually and/or collectively be configured to control the electronic device to: receive, while providing a first audio to the speaker based on at least one first application and displaying a first screen in a displaying area of the display, a first specified request from another electronic device via the communication circuitry; transmit, in response to receiving the first specified request, a first signal for outputting the first screen displayed in the displaying area to the another electronic device, and a second signal for outputting the first audio output from the speaker to the another electronic device; while transmitting the first signal and the second signal, receive, from the another electronic device, a second specified request for executing a second application different from the first application by the electronic device; in response to receiving the second preset request, display, in the displaying area, the first screen among the first screen and a second screen obtained by execution of the second application, and further transmits, to the another electronic device, a third signal for displaying the second screen in the another electronic device, and a fourth signal for outputting a second audio obtained from the second application to the another electronic device.

For example, while transmitting the fourth signal to the another electronic device, the second signal may include data for providing the second audio associated with the second screen based on mute.

For example, the second signal may include, while transmitting the fourth signal to the another electronic device, data for reproducing the first audio by the another electronic device based on a volume different from mute.

For example, at least one processor may, individually and/or collectively, be configured to control the electronic device to: transmit, before receiving the first specified request, the first audio, among a plurality of preset channels, to a first channel corresponding to the speaker; transmit, in response to receiving of the first specified request, the first audio to a second channel different from the first channel; in a state of transmitting the first audio via the second channel, transmit, in response to receiving of the second preset request, the second audio to a third channel different from the first channel and the second channel.

For example, at least one processor may, individually and/or collectively, be configured to control the electronic device to: obtain, in response to receiving the second specified request, using another signal path different from a signal path for transmitting the second audio via the third channel, the fourth signal corresponding to the second audio.

For example, at least one processor may, individually and/or collectively, be configured to: identify, in response to receiving the specified request, an identifier assigned to the second application according to execution of the second application; and control the electronic device to transmit, based on the identification of the identifier, the third signal and the fourth signal to the another electronic device.

For example, at least one processor may, individually and/or collectively, be configured to control the electronic device to: in a state of transmitting the third signal and the fourth signal, transmit, based on another identifier different from the identifier, the first signal and the second signal to the another electronic device.

For example, the identifier and the another identifier may be assigned to independently control, by the another electronic device, a volume of the first audio corresponding to the second signal and a volume of the second audio corresponding to the fourth signal.

As described above, according to an example embodiment, a method of operating an electronic device may comprise: receiving, while providing a first audio to a speaker of the electronic device based on at least one first application and displaying a first screen in a displaying area of a display of the electronic device, a first specified request from another electronic device; transmitting, in response to receiving the first specified request, a first signal for outputting the first screen displayed in the displaying area to the another electronic device, and a second signal for outputting the first audio output from the speaker to the another electronic device; while transmitting the first signal and the second signal, receiving, from the another electronic device, a second specified request for executing a second application different from the first application by the electronic device; in response to receiving the second preset request, displaying, in the displaying area, the first screen among the first screen and a second screen obtained by execution of the second application, and further transmitting, to the another electronic device, a third signal for displaying the second screen in the another electronic device, and a fourth signal for outputting a second audio obtained from the second application to the another electronic device.

For example, while transmitting the fourth signal to the another electronic device, a method of operating an electronic device may further comprise obtaining the second signal based on data for providing the second audio associated with the second screen based on mute.

For example, the method of operating an electronic device may further comprise: transmitting, before receiving the first specified request, a first audio, among a plurality of preset channels, to a first channel corresponding to the speaker;

transmitting, in response to receiving of the first specified request, the first audio to a second channel different from the first channel; in a state of transmitting the first audio via the second channel, transmitting, in response to receiving of the second specified request, the second audio to a third channel different from the first channel and the second channel.

For example, the transmitting the third signal and the fourth signal may further comprise obtaining, using another signal path different from a signal path for transmitting the second audio via the third channel, the fourth signal corresponding to the second audio.

For example, the transmitting the third signal and the fourth signal may further comprise: identifying, in response to receiving the specified request, an identifier assigned to the second application according to execution of the second application; and transmitting, based on the identification of the identifier, the third signal and the fourth signal to another electronic device.

For example, the method of operating an electronic device may further comprise, in a state of transmitting the third signal and the fourth signal, transmitting, based on another identifier different from the identifier, the first signal and the second signal to the another electronic device.

For example, the fourth signal, transmitted to the another electronic device independent from the second signal, may be used to control a volume of the second audio corresponding to the fourth signal independent from a volume of the first audio corresponding to the second signal.

As described above, according to an example embodiment, an electronic device may comprise: communication circuitry, a display, a speaker, a memory storing a plurality of instructions and at least one processor operably coupled to the communication circuitry, the display, the speaker and the memory; and wherein at least one processor, comprising processing circuitry, may individually and/or collectively, be configured to control the electronic device to: output, in a first portion of the display, a first screen provided from another electronic device different from the electronic device via the communication circuitry, and output, via the speaker, a first audio corresponding to the first screen provided from the another electronic device; in a state of outputting the first screen and the first audio, output, in a second portion different from the first portion, a second screen provided from the another electronic device, and output, via the speaker, a second audio corresponding to the second screen provided from the another electronic device; and in a state of outputting the first screen, the second screen, the first audio and the second audio, adjust, in response to receiving an input for adjusting a volume of the first audio, the volume of the first audio independent from second audio output from the speaker.

For example, at least one processor may individually and/or collectively be configured to: adjust, in response to receiving the input performed based on a first visual object associated with the first screen, the volume of the first audio; independent from the first audio output from the speaker, adjust, in response to receiving another input performed based on a second visual object different from the first visual object, a volume of the second audio, wherein the second visual object is associated with the second screen.

For example, at least one processor may individually and/or collectively be configured to control the electronic device to: display, in the display, the first screen displaying in a displaying area of a display of the another electronic device, and the second screen independent from the displaying area.

For example, at least one processor may individually and/or collectively be configured to control the electronic device to: receive, via the communication circuitry, the first audio and the second audio by respectively using a first signal and a second signal having distinct identifiers.

For example, at least one processor may individually and/or collectively be configured to: request to the another electronic device, in response to receiving another input for selecting application included in a list of a plurality of applications stored in the another electronic device, for providing the second screen and the second audio based on the selected application.

As described above, according to an example embodiment, a method of operating an electronic device may comprise: outputting, in a first portion of the display, a first screen provided from another electronic device different from the electronic device via communication circuitry, and output, via a speaker, a first audio corresponding to the first screen provided from the another electronic device; in a state of outputting the first screen and the first audio, outputting, in a second portion different from the first portion, a second screen provided from the another electronic device, and outputting, via the speaker, a second audio corresponding to the second screen provided from the another electronic device; and in a state of outputting the first screen, the second screen, the first audio and the second audio, adjusting, in response to receiving an input for adjusting a volume of the first audio, the volume of the first audio independent from second audio output from the speaker.

The devices described heretofore may be implemented as hardware components, or software components, and/or a combination of the hardware components and the software components. For example, the devices and components described in the various example embodiments may be implemented using one or more general-purpose or special-purpose of computers, such as e.g., a processor, a controller, an arithmetic logic unit (ALU), a digital signal processor, a microcomputer, a field programmable gate array (FPGA), a programmable logic unit (PLU), a microprocessor, or any other device capable of executing and responding to instructions. A processing unit/device may execute an operating system (OS) and one or more software applications running on the operating system. Further, the processor(s) may access, store, manipulate, process, and generate data in response to execution of the software. For convenience of understanding, although it is sometimes described that a single processing unit is used, one of ordinary skill in the art will appreciate that the processing unit may include a plurality of processing elements and/or plural types of such processing elements. For example, the processing unit may include multiple processors or a single processor and at least one controller. Other processing configurations may be also possible, such as a parallel processor.

The software may include computer programs, codes, instructions, or a combination of one or more of the same, and configure a processing unit to operate as desired or command the processing unit independently or collectively. The software and/or data may be embodied in any type of machine, component, physical device, computer storage medium or device for interpretation by the processing unit or providing instructions or data to thereto. The software may be distributed over networked computer systems and stored or executed in a distributed manner Software and data may be stored in one or more computer-readable recording media.

The method according to various example embodiments may be implemented in the form of program instructions that can be executed through various computer means and recorded in a computer-readable medium. In this instance, the medium may be to continuously store the computer-executable program, or to temporarily store the program for execution or download. Further, the medium may be various recording means or storage means in the form of a single or several hardware combined together, which is not limited to a medium directly connected to any computer system and may exist distributed over a network. Examples of the recording media may include a magnetic medium such as e.g., a hard disk, a floppy disk and a magnetic tape, an optical recording medium such as e.g., CD-ROM and DVD, a magneto-optical medium such as e.g., a floptical disk, and those configured to store program instructions, such as e.g., ROM, RAM, flash memory, and the like. In addition, examples of other recording media may include recording media or storage media managed by an app stores distributing applications, websites supplying or distributing various other software, and servers.

As described above, although various example embodiments have been described with reference to some limited embodiments and drawings, various modifications and changes may be made from the above description by those skilled in the art. For example, although the techniques described above are performed in an order different from the described methods, and/or the described system, structure, apparatus, circuit, etc. are coupled or combined in a different form than the described method, and/or replaced or substituted by other components or equivalents thereof, an appropriate result can be achieved.

It will also be understood that any of the embodiment(s) described herein may be used in conjunction with any other embodiment(s) described herein.

What is claimed is:

1. An electronic device comprising:
communication circuitry;
a display;
a speaker;
memory comprising one or more storage media and storing instructions; and
at least one processor comprising processing circuitry,
wherein the instructions, when executed by the at least one processor individually or collectively, cause the electronic device to:
execute a first application;
transmit a first audio signal to the speaker and transmit a first video signal to the display based on the executing of the first application;
receive, from an external electronic device, a first request for mirroring a second application while executing the first application; and
mirror the second application based on the first request,
wherein the mirroring of the second application comprises:
executing the second application to obtain a second audio signal and a second video signal in a state in which the electronic device maintains transmitting of the first audio signal to the speaker and the first video signal to the display without displaying video corresponding to the second video signal on the display; and
transmit the second video signal and the second audio signal to the external electronic device.

2. The electronic device of claim 1, wherein the mirroring of the second application comprises transmitting of the first audio signal to the speaker and the first video signal to the display without displaying video corresponding to the second video signal on the display and without transmitting the second audio signal to the speaker.

3. The electronic device of claim 1, wherein instructions, when executed by the at least one processor individually or collectively, cause the electronic device to:
while transmitting the second audio signal to the external electronic device, include, in the second audio signal, data for reproducing by the external electronic device first audio corresponding to the first audio signal based on a volume different from mute.

4. The electronic device of claim 1, wherein instructions, when executed by the at least one processor individually or collectively, cause the electronic device to:
transmit, using the communication circuitry, before receiving the first request, the first audio signal, among a plurality of preset channels, to a first channel corresponding to the speaker;
transmit, using the communication circuitry, in response to receiving of the first request, the first audio signal to a second channel different from the first channel; and
in a state of transmitting the first audio signal via the second channel, transmit, using the communication circuitry, in response to receiving of the first request, the second audio signal to a third channel different from the first channel and the second channel.

5. The electronic device of claim 4, wherein instructions, when executed by the at least one processor individually or collectively, cause the electronic device to:
obtain, in response to receiving the first request, using another signal path different from a signal path for transmitting the second audio signal via the third channel, the second audio signal.

6. The electronic device of claim 1, wherein instructions, when executed by the at least one processor individually or collectively, cause the electronic device to:
transmit the first audio signal with a first volume to the speaker; and
transmit, to the external electronic device through the communication circuitry, the second audio signal with a second volume different from the first volume.

7. The electronic device of claim 1, wherein instructions, when executed by the at least one processor individually or collectively, cause the electronic device to:
receive, from the external electronic device, a second request for mirroring the first video signal and the first audio signal; and
based on receiving the second request while transmitting the second video signal and the second audio signal to the external electronic device, transmit the first video signal and the first audio signal to the external electronic device while maintaining to transmit the second video signal and the second audio signal to the external electronic device.

8. The electronic device of claim 1, wherein instructions, when executed by the at least one processor individually or collectively, cause the electronic device to:
identify, in response to receiving the first request, an identifier assigned to the second application according to execution of the second application; and
transmit, using the communication circuitry, based on the identification of the identifier, the second video signal and the second audio signal to the external electronic device.

9. A method of operating an electronic device including a speaker, a display, and communication circuitry, the method comprising:

transmitting a first audio signal to the speaker and transmitting a first video signal to the display based on execution of a first application;

receiving, from an external electronic device, a first request for mirroring a second application while executing the first application in the electronic device; and mirroring the second application based on the first request, wherein the mirroring of the second application comprises:

executing the second application to obtain a second audio signal and a second video signal in a state in which the electronic device maintains transmitting of the first audio signal to the speaker and the first video signal to the display without displaying video corresponding to the second video signal on the display; and transmitting the second video signal and the second audio signal to the external electronic device.

10. The method of claim 9, wherein the mirroring of the second application comprises transmitting of the first audio signal to the speaker and the first video signal to the display without displaying video corresponding to the second video signal on the display and without transmitting the second audio signal to the speaker.

11. The method of claim 9, further comprising:

transmitting, before receiving the first request, the first audio signal, among a plurality of specified channels, to a first channel corresponding to the speaker;

transmitting, in response to receiving of the first request, the first audio signal to a second channel different from the first channel; and in a state of transmitting the first audio signal via the second channel, transmitting, in response to receiving of the first request, the second audio signal to a third channel different from the first channel and the second channel.

12. The method of claim 11, wherein the transmitting the second video signal and the second audio signal further comprises:

obtaining, using another signal path different from a signal path for transmitting the second audio signal via the third channel, the second audio signal corresponding to second audio.

13. The method of claim 9, wherein the transmitting the second video signal and the second audio signal further comprises:

identifying, in response to receiving the first request, an identifier assigned to the second application according to execution of the second application; and transmitting, based on the identification of the identifier, the second video signal and the second audio signal to the external electronic device.

14. The method of claim 9, wherein the transmitting the first audio signal comprises:

transmitting the first audio signal with a first volume to the speaker; and wherein the transmitting the second audio signal comprises:

transmitting the second audio signal with a second volume different from the first volume.

15. The method of claim 9, wherein the second audio signal transmitted to the external electronic device independent from the first audio signal, is used to control a volume of second audio corresponding to the second audio signal independent from a volume of first audio corresponding to the first audio signal.

16. An electronic device comprising:

communication circuitry;

a display;

a speaker;

memory comprising one or more storage media storing instructions; and at least one processor comprising processing circuitry, wherein the instructions, when executed by the at least one processor individually or collectively, cause the electronic device to:

output, in a first portion of the display, a first screen provided from an external electronic device via the communication circuitry, and output, via the speaker, a first audio corresponding to the first screen provided from the external electronic device;

in a state of outputting the first screen and the first audio, output, in a second portion different from the first portion, a second screen provided from the external electronic device, and output, via the speaker, a second audio corresponding to the second screen provided from the external electronic device; and in a state of outputting the first screen, the second screen, the first audio and the second audio, adjust, in response to receiving an input for adjusting a volume of the first audio, the volume of the first audio independent from second audio output from the speaker.

17. The electronic device of claim 16, wherein instructions, when executed by the at least one processor individually or collectively, cause the electronic device to:

adjust, in response to receiving the input performed based on a first visual object associated with the first screen, the volume of the first audio; and independent from the first audio output from the speaker, adjust, in response to receiving another input performed based on a second visual object different from the first visual object, a volume of the second audio, wherein the second visual object is associated with the second screen.

18. The electronic device of claim 16, wherein instructions, when executed by the at least one processor individually or collectively, cause the electronic device to:

display, in the display, the first screen displaying in a displaying area of a display of the external electronic device, and the second screen independent from the displaying area.

19. The electronic device of claim 16, wherein instructions, when executed by the at least one processor individually or collectively, cause the electronic device to:

receive, via the communication circuitry, the first audio and the second audio by respectively using a first signal and a second signal having distinct identifiers.

20. The electronic device of claim 16, wherein instructions, when executed by the at least one processor individually or collectively, cause the electronic device to:

request to the external electronic device, in response to receiving another input for selecting an application included in a list of a plurality of applications stored in the external electronic device, for providing the second screen and the second audio based on the selected application.

* * * * *